US007502022B2

(12) United States Patent
Ageishi et al.

(10) Patent No.: US 7,502,022 B2
(45) Date of Patent: Mar. 10, 2009

(54) SYNTHESIS MODE, SYNTHESIS WRITING MODE, AND READING MODE FOR POWER SAVING IN A PORTABLE DEVICE

(75) Inventors: Narutoshi Ageishi, Ichinomiya (JP); Yukiyasu Fukami, Nagoya (JP)

(73) Assignee: Panasonic Corporation, Osaka (JP)

( * ) Notice: Subject to any disclaimer, the term of this patent is extended or adjusted under 35 U.S.C. 154(b) by 625 days.

(21) Appl. No.: 11/129,310

(22) Filed: May 16, 2005

(65) Prior Publication Data

US 2005/0253868 A1 Nov. 17, 2005

(30) Foreign Application Priority Data

May 17, 2004 (JP) ............................. 2004-146284

(51) Int. Cl.
*G06F 3/038* (2006.01)
*G06F 1/26* (2006.01)
*G06F 1/00* (2006.01)
*G09G 5/00* (2006.01)

(52) U.S. Cl. ....................... 345/214; 345/215; 345/619; 345/629; 345/631; 345/634; 345/637; 713/320; 713/323; 713/340

(58) Field of Classification Search ................. 345/214, 345/215, 619, 629, 631, 634, 637; 713/320, 713/323, 340
See application file for complete search history.

(56) References Cited

U.S. PATENT DOCUMENTS 4,964,699 A * 10/1990 Inoue .......................... 345/98
5,477,490 A * 12/1995 Miyawaki et al. ........... 365/194
5,512,921 A * 4/1996 Mital et al. ................. 345/555
5,907,859 A * 5/1999 Shimada et al. ............. 711/112
6,055,640 A * 4/2000 Kageshima et al. ......... 713/320
6,595,342 B1 * 7/2003 Maritzen et al. ............ 194/212
7,142,221 B2 * 11/2006 Sakamaki et al. ........... 345/592
2004/0066381 A1 * 4/2004 Lin et al. .................... 345/204
2004/0105688 A1 * 6/2004 Komori ......................... 399/8
2005/0030376 A1 * 2/2005 Terada et al. ................ 348/143

FOREIGN PATENT DOCUMENTS

JP 2000-259140 9/2000
JP 2000259140 A * 9/2000
JP 2001320519 A * 11/2001

* cited by examiner

*Primary Examiner*—Ulka Chauhan
*Assistant Examiner*—Jeffrey J Chow
(74) *Attorney, Agent, or Firm*—Wenderoth, Lind & Ponack, L.L.P.

(57) ABSTRACT

An image synthesis output apparatus is capable of saving power in the stage of obtaining a synthetic image of a plurality of images. In the apparatus, during a period when either of first and second input images is updated within a first predetermined period, a multi-layer image synthesis section synthesizes these input images and outputs a synthetic image to an LCD display panel. If neither of the first and second input images are updated within the first predetermined period, the multi-layer image synthesis section also writes the synthetic image in a synthetic- image storage section. If the first and second input images are not updated and a second predetermined period elapses after the first predetermined period, then without synthesizing the first and second input images, the multi-layer image synthesis section reads the synthetic image and outputs it to the LCD display panel.

11 Claims, 18 Drawing Sheets

SYNTHESIS MODE, SYNTHESIS WRITING MODE, AND READING MODE FOR POWER SAVING IN A PORTABLE DEVICE

BACKGROUND OF THE INVENTION

1. Field of the Invention

The present invention relates to an image synthesis output apparatus which synthesizes a plurality of images that are stored in an image storage means and generates a synthetic image that is displayed in a single display screen. It also relates to an image synthesis output method and a program product for the same purpose. In addition, the present invention relates to an image synthesis display apparatus which generates and displays the synthetic image, and portable communication equipment which includes the image synthesis display apparatus.

2. Description of the Related Art

As an image synthesis output apparatus according to a prior art, there is known, for example, the one which is incorporated in a computer system, as described in Japanese Unexamined Patent Publication No. 2000-259140 specification. FIG. 18 is a block diagram, showing the configuration of the main part of this computer system 900. The computer system 900 includes, as its primary elements, a personal computer (hereinafter, suitably described simply as the "PC") 910, and a display monitor 920. The computer system 900 includes various component parts except them. However, those component parts are not directly related to the present invention, and thus, they are omitted.

The computer system 900 executes a multi-step power-saving control of the display monitor 920, using a VRAM-state notification signal 932. The VRAM-state notification signal 932 shows whether or not there is writing access to a video RAM 914 for forming an image (in this specification, "image data" which is a signal that expresses an image is also suitably described as the "image"). The PC 910 includes a display control section 912, and the display control section 912 is provided with a display controller 913 and the video RAM 914. The display control section 912 transmits, to the display monitor 920, the VRAM-state notification signal 932, as well as a video signal 931 which is an image for display.

The display controller 913 controls a display operation of the display monitor 920. It reads an image from the video RAM 914 at a certain screen refresh-rate. Then, it converts the image into a video signal 931 which has the three primary colors of R-G-B for display, and outputs it to the display monitor 920. The video RAM 914 stores an image which is displayed in the display monitor 920. It receives writing access by the control of software which is executed in the PC 910. Writing access is given to the video RAM 914, and thereby, the data or image which is stored in the video RAM 914 is rewritten. As a result, the image which is displayed in the display monitor 920 is updated.

If writing access is given to the video RAM 914, the VRAM-state notification signal 932 changes from "0" to "1". Thereby, the display monitor 920 is notified that the writing access has been executed. If the writing access to the video RAM 914 is completed, the VRAM-state notification signal 932 returns to its former state of "0".

While the PC 910 is executing processing, writing access to the video RAM 914 is executed each time an image is formed by the software control. However, while the PC 910 stays in an idle state, such as on standby for a key input, an image formation processing is not usually executed by the software control. The display monitor 920 refers to the change from "0" to "1" of the VRAM-state notification signal 932 and its return from "1" to "0". Thereby, the state of writing access to the video RAM 914 by the PC 910 can be detected.

The display monitor 920 is an external display unit which is connected to the PC 910, such as a CRT monitor. The display monitor 920 includes, for power-saving control, a timer 921 and a power-down control section 922. Based on the VRAM-state notification signal 932 which it receives, the timer 921 measures the time which elapses after the writing access to the video RAM 914 has stopped. In other words, it measures the time which elapses after the PC 910 has become idle, thus the image which is stored in the video RAM 914 has not been updated, and thereby, the image which is displayed in the display monitor 920 has not been updated.

If the VRAM-state notification signal 932 becomes "1", or if the timer 921 is reset by a system reset or the like, then the timer 921 starts a time-counting operation. This time-counting operation continues until the VRAM-state notification signal 932 becomes "1" again and is received. The power-down control section 922 executes a multi-step control of the display of the display monitor 920, according to the length of the time which is measured by the timer 921, or the time which elapses after the update of an image has stopped. Specifically, the longer the time which elapses after the update of an image has stopped becomes, the lower power-consumption state the display will be shifted into, step by step, from an ordinary display state, a low brightness state and a display-off state to a power-off state.

Hence, in the computer system 900, instead of measuring the time which elapses after a key input has not been executed, the PC 910 notifies, using the VRAM-state notification signal 932, the display monitor 920 whether or not there is writing access to the video RAM 914. Based on the VRAM-state notification signal 932, the display monitor 920 measures the time which elapses after the update of the image has stopped, or the time which elapses after the writing access for image formation to the video RAM 914 has stopped. According to the time which has elapsed, a multi-step power-saving control is executed. Thereby, the display monitor 920 can take the lead in controlling its display state step by step. As a result, in the computer system 900, the processing load on the PC 910 becomes lighter than that of a computer system in which a personal computer takes the lead in controlling and determining the display state of the display monitor 920.

However, a conventional image synthesis display apparatus executes a power-saving control only at the stage of displaying an image. In other words, a power-saving control is not considered at the stage of synthesizing and creating an image to be displayed. For example, in an image synthesis display apparatus which is incorporated in the computer system 900, a power-saving control of the display monitor 920 is executed at the time when an image is not updated. However, the power conservation of the display control section 912 in the PC 910 is not taken into account at all.

BRIEF SUMMARY OF INVENTION

In view of the aforementioned disadvantage, it is an object of the present invention to provide an image synthesis output apparatus, an image synthesis display apparatus, portable communication equipment, an image synthesis output method and a program product which are capable of saving a power consumption that is necessary for obtaining a synthetic image of a plurality of images which are stored in a means for storing the images, during a period when the stored images are not updated.

In order to resolve the aforementioned disadvantage and attain this object, an aspect of the present invention is directed to an image synthesis output apparatus which receives an input of a plurality of images, synthesizes the plurality of images to generate a synthetic image, and outputs the synthetic image as an output image. The apparatus comprises: an input-image storage section which stores the plurality of images that are inputted; a synthetic-image storage section which stores the synthetic image; an image synthesis section which shifts an operation mode among a plurality of modes that include a synthesis writing mode in which the plurality of images that are stored in the input-image storage section are read and synthesized to generate the synthetic image, and the synthetic image is outputted as the output image and is written in the synthetic-image storage section, and a reading mode in which the synthetic image that is stored in the synthetic-image storage section is read and is outputted as the output image; and a mode control section which gives the image synthesis section an instruction for any of the plurality of modes.

The mode control section includes: a synthesis-writing mode instruction section which gives the image synthesis section an instruction for the synthesis writing mode, during the period of time from a latest update time when at least one of the plurality of images which are stored in the input-image storage section is updated latest to the time when a first predetermined period elapses after the latest update time; and a reading mode instruction section which gives the image synthesis section an instruction for the reading mode, during a period of time after the first predetermined period elapses from the latest update time.

The aspect of the present invention makes it possible to save a power consumption that is necessary for obtaining a synthetic image of a plurality of images which are stored in a means for storing an image, during the period when the stored images are not updated.

These and other objects, features and advantages of the present invention will become more apparent upon reading of the following detailed description along with the accompanied drawings.

DETAILED DESCRIPTION OF INVENTION

Hereinafter, embodiments of the present invention will be described with reference to the accompanied drawings.

First Embodiment

Figure 1:
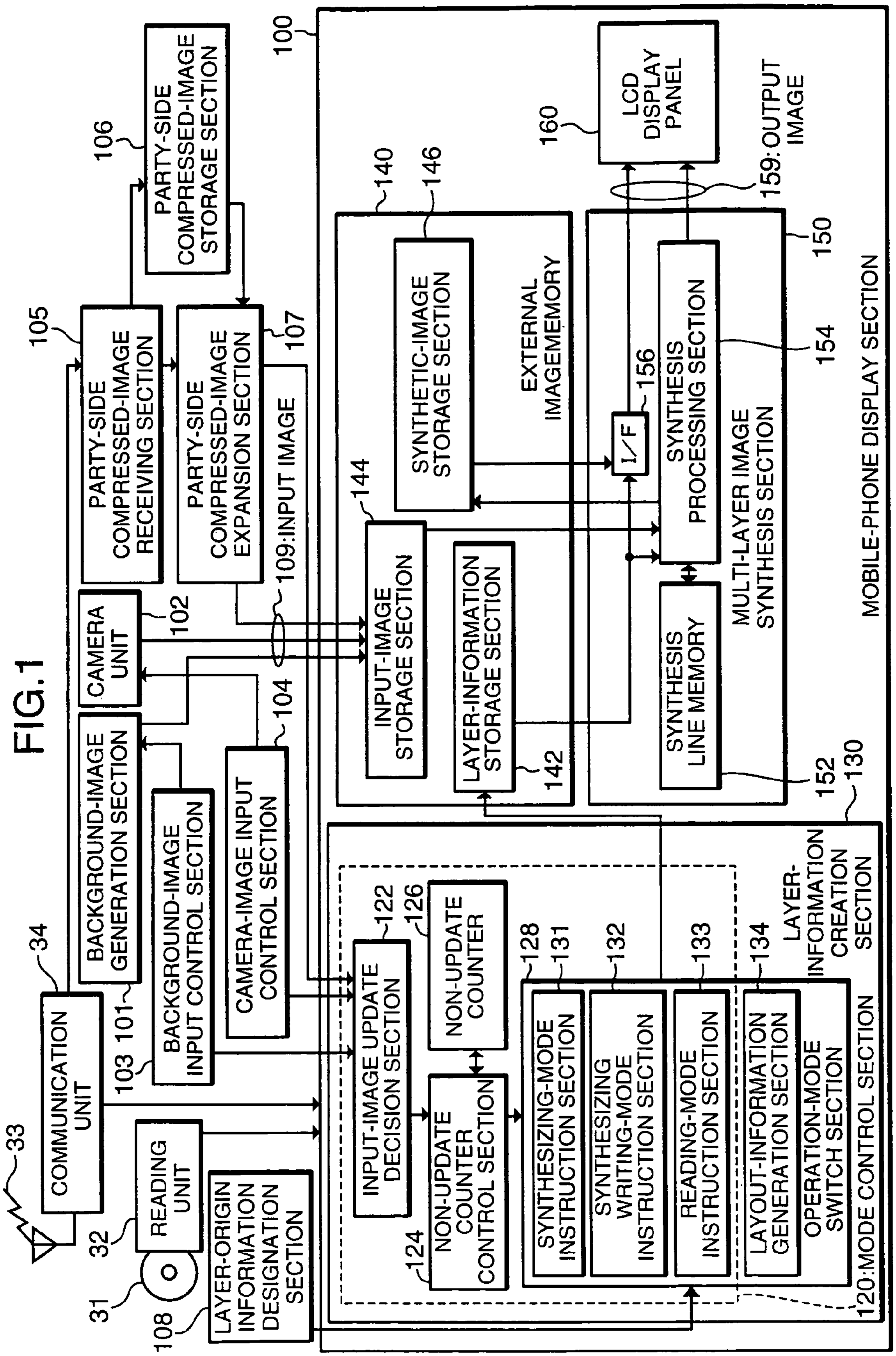
FIG. 1 is a block diagram, showing the configuration of an image synthesis display apparatus and its peripheral part according to a first embodiment of the present invention.

FIG. 1 is a block diagram, showing the configuration of an image synthesis display apparatus and its peripheral part according to a first embodiment of the present invention. This image synthesis display apparatus is embodied as a mobile-phone display section 100 which is incorporated in a cellular phone. The peripheral part of the mobile-phone display section 100 shown in FIG. 1 represents device elements inside of the cellular phone.

Needless to say, the image synthesis display apparatus according to the present invention is realized not only as the display section of a cell-phone, but also as the display section of various types of equipment. For example, there are mentioned the display section of a portable personal computer such as a lap-top personal computer, the display section of a portable information terminal apparatus called a PDA or the like, the display section of audio-video equipment such as a DVD player and a CD player, the display section of a home electrical appliance, the display section of electronic equipment for business such as a copying machine and a fax machine, and the like. Especially, in portable communication equipment such as a cell-phone and a portable information terminal apparatus, a battery is used as its power source. Hence, the configuration according to the present invention helps save its power consumption, thus making it more portable and useful.

The entire part of a cellular phone is configured by not only the mobile-phone display section 100 shown in FIG. 1, but also various elements for sending and receiving a communication or making a phone call. However, these elements do not relate directly to the essence of the present invention and are conventionally well known. Thus, their description is omitted or simplified.

The mobile-phone display section 100 includes: a layer-information creation section 130; an external image memory 140; a multi-layer image synthesis section 150; and an LCD display panel 160. The LCD display panel 160 is a specific example of the display unit according to the present invention. It may also be replaced with a CRT display unit (or a cathode-ray tube display unit), an EL, a PDP, or another type of display device.

In the mobile-phone display section 100, several kinds of images to be displayed in the LCD display panel 160 are each inputted as an input image 109. The mobile-phone display section 100 synthesizes the input images 109 of these kinds to generate a synthetic image. Then, the synthetic image is displayed in the LCD display panel 160. The cellular phone illustrated in FIG. 1 includes a camera 102. Using it, an image on the other side, an image on this side and a background image can be inputted as the input images 109 in the mobile-phone display section 100.

Figure 2:
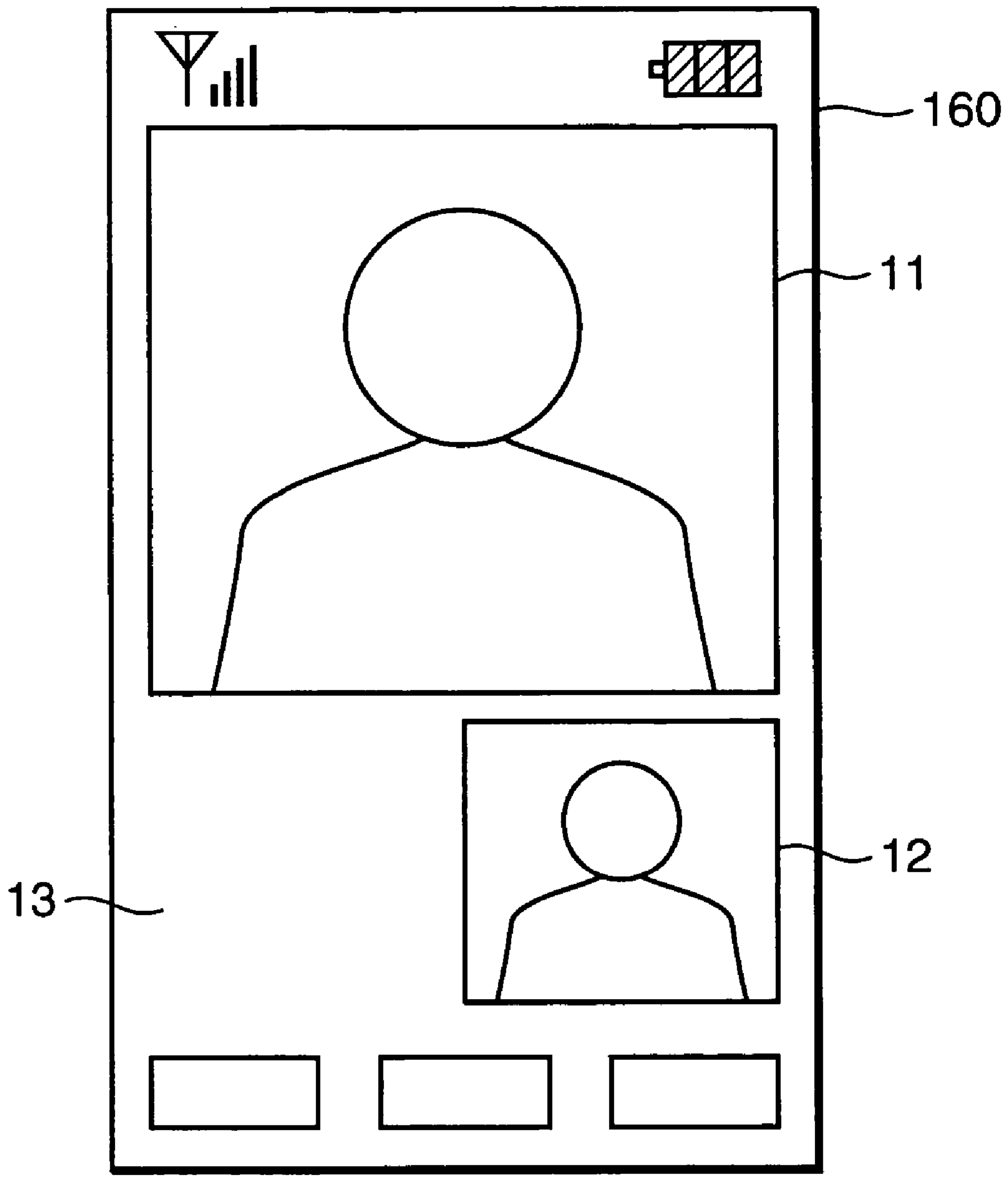
FIG. 2 is a front view of the screen of an LCD display panel in FIG. 1, illustrating the disposition of images which are displayed.

As a result, as shown in FIG. 2, in the LCD display panel 160, a synthetic image is displayed which has been formed by synthesizing an image 11 on the other side, an image 12 on this side and a background image 13. The image 11 on the other side is an image which is taken by the camera of a mobile phone at the other end of communication (referred to as the party side). Then, it is sent through a transmission path by radio or the like and is received and regenerated by this side of communication (referred to as the self side). The self-side image 12 is a monitor image which is taken by the camera on the self side. The background image 13 is an image which is the backdrop for the party-side image 11 and the self-side image 12. It simultaneously displays information on a battery, information on radio-wave conditions, or the like.

Returning to FIG. 1, the external image memory 140 includes as its primary elements: an input-image storage section 144; a layer-information storage section 142; and a synthetic-image storage section 146. The input-image storage section 144 stores the input images 109. Among the input images 109, the party-side image 11 is inputted in the input-image storage section 144, through a communication unit 34, a party-side compressed-image receiving section 105, a party-side compressed-image storage section 106 and a party-side compressed-image expansion section 107. The party-side compressed-image receiving section 105 receives an image which is sent in a data-compression format from the party side. The party-side compressed-image storage section 106 stores the received compressed image. The party-side compressed-image expansion section 107 expands the compressed image which is stored in the party-side compressed-image storage section 106. Thereby, the party-side image 11 is obtained in a non-compression format.

Among the input images 109, the self-side image 12 is generated by a camera unit 102. The camera unit 102 includes an image-pickup section which has a CCD (or charge coupled device) image-pickup element, and a DMA (or direct memory access) circuit. The DMA circuit is a circuit for gaining direct access to a memory without passing through a CPU. Among the input images 109, the background image 13 is generated by a background-image generation section 101. If a new image is inputted as the party-side image 11 in the input-image storage section 144, the input-image storage section 144 stores the new image in the way to update the party-side image 11 which is already stored. The same is also applied to the self-side image 12 and the background image 13.

The layer-information storage section 142 stores layer information which is inputted from the layer-information creation section 130. The layer information includes a layout information which is information on the layout of an image, such as the party-side image 11 that is included in the input images 109, and a mode instruction information which is information for giving an instruction for an operation mode of the multi-layer image, synthesis section 150. The synthetic-image storage section 146 stores a synthetic image which is generated based on the input images 109 that is stored in the input-image storage section 144.

The external image memory 140 needs to store an image whose data quantity is large. Hence, desirably, it should be formed by a large-capacity DRAM (or dynamic random access memory) which is available at a low price. It is desirable that the layer-information storage section 142, the input-image storage section 144 and the synthetic-image storage section 146 each be a memory space which is allocated to the external image memory 140 as a single RAM. This makes it possible to realize these storage sections 142, 144 and 146 at a low cost. Using the external image memory 140 as a single RAM in the form of time sharing, these memory spaces may also overlap at a part or the whole of them. If a memory space of a single RAM is designed to be allocated to each storage section 142, 144 and 146, then the leading address of each allocated memory space is designated, so that any of the storage sections 142, 144 and 146 can be chosen and used.

The multi-layer image synthesis section 150 corresponds to a specific example of the image synthesis section according to the present invention. It includes a line memory 152 for synthesis, a synthesis processing section 154 and a memory interface 156. Thereby, based on the mode instruction information which is stored in the layer-information storage section 142, the multi-layer image synthesis section 150 chooses and executes any of the several operation modes. The several operation modes include a synthesizing mode, a synthesis writing mode and a reading mode.

In the synthesizing mode, the synthesis processing section 154 reads and synthesizes the input image 109 which is stored in the input-image storage section 144. Thereby, a synthetic image is generated and outputted as an output image 159 to the LCD display panel 160. In the synthesis recording mode, the synthesis processing section 154 reads and synthesizes the input image 109 which is stored in the input-image storage section 144. Thereby, a synthetic image is generated and outputted as an output image 159 to the LCD display panel 160. Then, it writes the synthetic image in the synthetic-image storage section 146. In the reading mode, the memory interface 156 reads the synthetic image which is stored in the synthetic-image storage section 146. Then, it outputs it as the output image 159. The synthesis processing section 154 and the memory interface 156 output the output image 159, synchronously with a cycle in which the LCD display panel 160 scans one screen. In the synthesizing mode and the synthesis recording mode, the memory interface 156 stops the image reading operation. On the other hand, in the reading mode, the synthesis processing section 154 stops the image synthesis processing.

When the synthesis processing section 154 executes synthesis processing for generating the synthetic image out of the input images 109, it refers to the layout information which is stored in the layer-information storage section 142. Thereby, it decides the disposition and size of each input image 109 inside of the synthetic image. It also decides if each input image 109 overlaps, which should be displayed in the upper layer, or which should be given priority. The synthesis processing section 154 executes the synthesis processing by writing the input images 109 in the synthesis line memory 152, at every line or every several lines. The synthesis processing will be described in detail later.

It is enough that the synthesis line memory 152 stores an image which has one line or several lines and a relatively small data quantity. On the other hand, it needs to write and read it at high speed. Thus, desirably, it should be formed by an SRAM (or static random access memory). The synthesis processing section 154 and the memory interface 156 need to execute high-speed processing. Hence, it is desirable that it be realized using a hardware circuit with no software.

The layer-information creation section 130 includes: an input-image update decision section 122; a non-update counter control section 124; a non-update counter 126; and an operation-mode switch section 128. The operation-mode switch section 128 is provided with: a synthesizing-mode instruction section 131; a synthesis writing-mode instruction section 132; a reading-mode instruction section 133; and a layout-information generation section 134. Among them, the input-image update decision section 122, the non-update counter control section 124, the non-update counter 126, the synthesizing-mode instruction section 131, the synthesis writing-mode instruction section 132 and the reading-mode instruction section 133, configure a mode control section 120 which gives the multi-layer image synthesis section 150 an instruction for an operation mode.

The input-image update decision section 122 detects that at least one of the party-side image 11, the self-side image 12 and the background image 13 which make up the input image 109 has been updated. Every time the party-side image 11 is updated, the party-side compressed-image expansion section 107 notifies the input-image update decision section 122 of a notification signal for the update. A camera-image input control section 104 controls the camera unit 102. Every time it gives the camera unit 102 an instruction to pick up one frame of an image, it notifies the input-image update decision section 122 of a notification signal for the update of the self-side image 12. In the same way, a background-image input control section 103 controls the background-image generation section 101. Every time it gives the background-image generation section 101 an instruction to generate a new background image, it notifies the input-image update decision section 122 of a notification signal for the update of the background image 13. Based upon these notification signals, the input-image update decision section 122 detects that the input image 109 has been updated which is stored in the input-image storage section 144. In addition, the input-image update decision section 122 sends, to the non-update counter control section 124, a decision on whether or not the input image 109 has been updated.

Based upon the decision which has been made by the input-image update decision section 122, the non-update counter control section 124 controls a count value in the non-update counter 126. It also compares the count value with a predetermined value. Then, the non-update counter control section 124 sends the comparison result to the operation-mode switch section 128. Particularly, if the decision which has been sent from the input-image update decision section 122 indicates that the input image 109 has been updated, the non-update counter control section 124 resets the count value. Based upon the comparison result which has been sent by the non-update counter control section 124, the synthesizing-mode instruction section 131, the synthesis writing-mode instruction section 132 and the reading-mode instruction section 133, which are included in the operation-mode switch section 128 choose an operation mode which should be taken by the multi-layer image synthesis section 150. Then, they create mode instruction information for instructing it to take the operation mode which they have chosen. Next, they write it in the layer-information storage section 142.

Based upon layer-origin information which is generated by a layer-origin information designation section 108, the layout-information generation section 134 generates layout information. Then, it writes it in the layer-information storage section 142. The layer-origin information designation section 108 which belongs to the peripheral-unit part of the mobile-phone display section 100 generates layer-origin information as information which is the origin of the layout information. Then, it inputs it in the layout-information generation section 134. For example, unless a user operates a key, the layer-origin information designation section 108 generates the contents of default (i.e., initialization) as the layer-origin information. If the user operates the key, then in response to this, it changes the contents of the layer-origin information.

The layer-information creation section 130, the background-image input control section 103, the camera-image input control section 104 and the layer-origin information designation section 108 can also be formed by hardware with no program. However, it is simpler and easier to form them by a computer such as a microcomputer in which a program is installed. Such a computer includes a CPU (or central processing unit; not shown), an RAM (or random access memory; not shown) or an ROM (or read only memory; not shown) which stores a program for defining the operation of this CPU, and a storage section such as an RAM (not shown) which stores data temporarily.

The above described program can be supplied through a record medium 31, such as an ROM, a flexible disk and a CD-ROM. It may also be supplied through a transmission medium 33, such as a telephone line and a network. In FIG. 1, a CD-ROM is shown as the record medium 31, and a radio transmission medium is shown as the transmission medium 33.

The program which is stored in the CD-ROM as the record medium 31 can be read by connecting a CD-ROM reading unit 32 as an external unit to a cellular phone. In addition, it can also be stored in a storage unit such as an RAM (not shown) or a hard disk which is provided in the cellular phone. In the case where the program is supplied in the form of an ROM as the record medium 31, the ROM is mounted in the cellular phone. Thereby, the layer-information creation section 130 or the like can execute the processing according to such a program.

The program which is supplied through the transmission medium 33 is received via the communication unit 34. Then, it is stored in the storage unit such as an RAM (not shown) or a hard disk which is provided in the cellular phone. The transmission medium 33 is not limited to the radio transmission medium as described above. Besides, the transmission medium 33 includes not only a communication line, but also a relay unit which relays the communication line, such as a communication link including a router.

Figure 3:
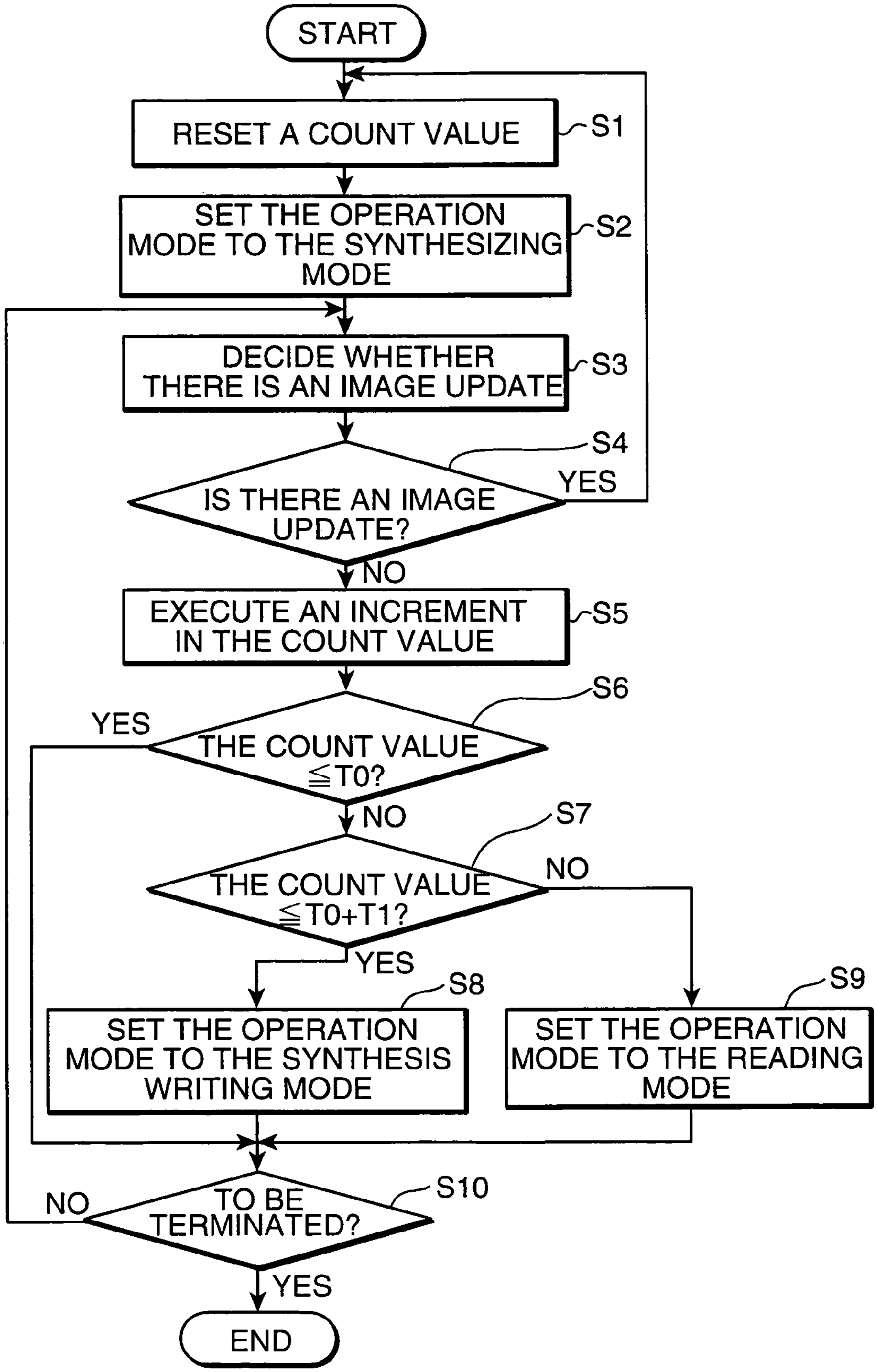
FIG. 3 is a flow chart, showing the operational procedure of a layer-information creation section in FIG. 1.

Next, the operation of the mobile-phone display section 100 will be described in detail. FIG. 3 is a flow chart, showing the operational procedure of the layer-information creation section 130. If a user operates a key or the like, the mobile-phone display section 100 starts to operate. Then, the non-update counter control section 124 resets a count value of the non-update counter 126 (Step S1). In response to the reset, the count value is set, for example, to "0". Next, the non-update counter control section 124 notifies the operation-mode switch section 128 that the count value has become "0". Thereby, the synthesizing-mode instruction section 131 sets, to a synthesizing mode, the operation mode of the multi-layer image synthesis section 150 (Step S2). Specifically, the synthesizing-mode instruction section 131 writes mode instruction information which gives an instruction for the synthesizing mode in the layer-information storage section 142.

Next, the input-image update decision section 122 decides whether or not the input images 109 which is stored in the input-image storage section 144 has been updated (Step S3). The loop in FIG. 3 makes a round in each cycle where the multi-layer image synthesis section 150 outputs one frame of the synthetic image as the output image 159, or in each frame cycle. Along with this, the processing in the step S3 is repeated in each cycle. If the input-image update decision section 122 detects that the input images 109 has been updated (Yes at a step S4), the processing returns to the step S1. Then, the non-update counter control section 124 resets a count value, regardless of the count value (Step S1). On the other hand, unless the input-image update decision section 122 detects that the input images 109 has been updated (No at the step S4), the processing goes ahead to a step S5. In the step S5, the non-update counter control section 124 executes an increment in the count value. As an example, "1" is added to the count value.

Next, the non-update counter control section 124 decides whether or not the count value is equal to, or below, a predetermined value T0 (Step S6). The count value is a value whose unit is a frame cycle, and thus, the predetermined value T0 corresponds to a predetermined period of time. This predetermined period is referred to as a first predetermined period. If the count value is equal to, or below, the first predetermined period T0 (Yes at the step S6), the processing moves to a step S10. On the other hand, if the count value is above the first predetermined period T0 (NO at the step S6), the non-update counter control section 124 decides whether or not the count value is equal to, or below, the sum of the predetermined value T0 and another predetermined value T1 (Step S7). In the same way as the predetermined value T0, the predetermined value T1 corresponds to a predetermined period of time. This predetermined period is referred to as a second predetermined period.

If the count value is equal to, or below, the sum of the first predetermined period T0 and the second predetermined period T1 (Yes at the step S7), the non-update counter control section 124 sends that decision to the operation-mode switch section 128. Based upon the sent decision, the synthesis writing-mode instruction section 132 sets, to a synthesis writing mode, the operation mode of the multi-layer image synthesis section 150 (Step S8). Specifically, the synthesis writing-mode instruction section 132 writes mode instruction information which gives an instruction for the synthesis writing mode in the layer-information storage section 142. On the other hand, if the count value is above the sum of the first predetermined period T0 and the second predetermined period T1 (No at the step S7), then the non-update counter control section 124 sends that decision to the operation-mode switch section 128. Based on the sent decision, the reading-mode instruction section 133 sets, to a reading mode, the operation mode of the multi-layer image synthesis section 150 (Step S9). Specifically, the reading-mode instruction section 133 writes mode instruction information which gives an instruction for the reading mode in the layer-information storage section 142. Then, if the processing in the step S8 or S9 is completed, the processing shifts to the step S10.

In the step S10, the layer-information creation section 130 decides whether or not the processing should be terminated. If a user is executing a predetermined key operation, or in another such case, the processing should be terminated. In that case, the layer-information creation section 130 terminates the processing. On the other hand, if the processing should not be terminated, the layer-information creation section 130 returns the processing to the step S3.

As described above, the layer-information creation section 130 repeats, in each frame cycle, the loop of the steps S1 to S4 or the loop of the steps S3 to S10. It chooses any of the three kinds of modes, based on the count value which changes in each frame cycle. The count value corresponds to the time which elapsed after the latest update time when the input image 109 has been updated latest. Hence, the layer-information creation section 130 chooses any of the three kinds of modes, according to the length of the time which elapsed after the latest update time.

The first predetermined period T0 and the second predetermined period T1 are measured in the unit of a frame cycle. Therefore, the operation mode can be changed in line with the frame-unit operation of the multi-layer image synthesis section 150. As described later, in the synthesis writing mode, a power consumption is usually far larger than that of either of the other operation modes. The second predetermined period T1 is set to the same length as the frame cycle, and thereby, the period of the synthesis writing mode in which a power consumption is relatively large can be kept at a required minimum length.

Figure 4:
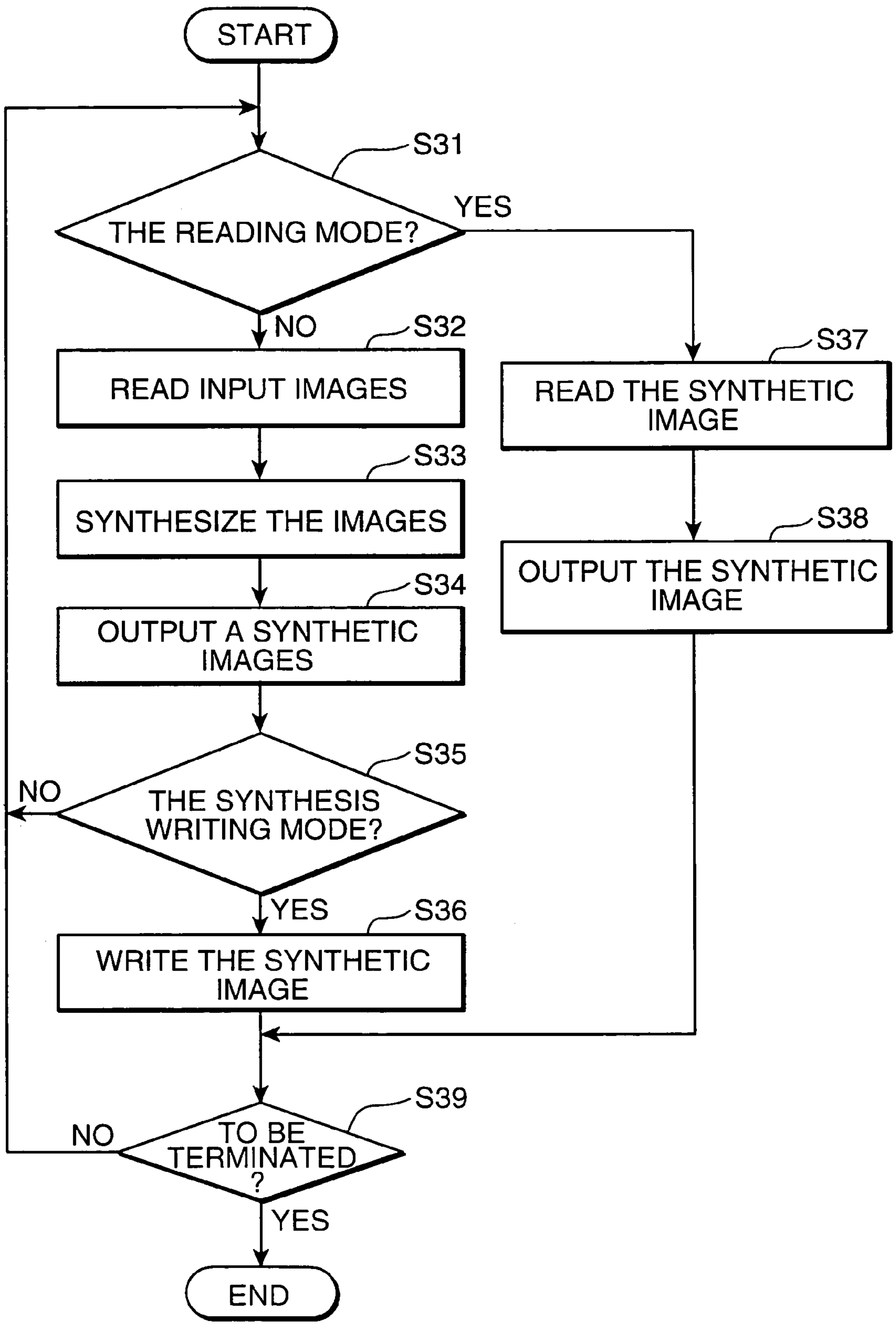
FIG. 4 is a flowchart, showing the operational procedure of a multi-layer image synthesis section in FIG. 1.

FIG. 4 is a flow chart, showing the operational procedure of the multi-layer image synthesis section 150. If a user operates a key or the like, the mobile-phone display section 100 starts to operate. Then, the synthesis processing section 154 and the memory interface 156 read mode instruction information which is stored in the layer-information storage section 142. Then, they decide whether or not the mode instruction information is giving an instruction for the reading mode (Step S31).

If the mode instruction information is not giving an instruction for the reading mode (No at the step S31), that means the mode instruction information is giving an instruction for the synthesizing mode or the synthesis writing mode. Therefore, in this case, the memory interface 156 does not read an image, while the synthesis processing section 154 reads the input images 109 from the input-image storage section 144 (Step S32). Next, the synthesis processing section 154 executes writing and reading for the synthesis processing section 154. Thereby, it synthesizes the input images 109 to generate a synthetic image (Step S33). Sequentially, the synthesis processing section 154 outputs the synthetic image which it has synthesized as the output image 159 to the LCD display panel 160 (Step S34).

Next, the synthesis processing section 154 decides whether or not the mode instruction information is giving an instruction for the synthesis writing mode (Step S35). If the mode instruction information is giving an instruction for the synthesis writing mode (Yes at the step S35), the synthesis processing section 154 writes, in the synthetic-image storage section 146, the synthetic image which it has generated in the step S33 (Step S36). Thereafter, the processing moves ahead to a step S39. On the other hand, unless the mode instruction information is giving an instruction for the synthesis writing mode (No at the step S35), the processing goes back to the step S31.

In the decision at the step S31, if the mode instruction information is giving an instruction for the reading mode (Yes at the step S31), the synthesis processing section 154 does not execute the synthesis processing of the images. On the other hand, the memory interface 156 reads the synthetic image which is stored in the synthetic-image storage section 146 (Step S37). Next, the memory interface 156 outputs the synthetic image which it has read as the output image 159 to the LCD display panel 160 (Step S38). Afterward, the processing shifts to the step S39.

In the step S39, the multi-layer image synthesis section 150 decides whether or not the processing should be terminated. If a user is executing a predetermined key operation, or in another such case, the processing should be terminated. In that case, the multi-layer image synthesis section 150 terminates the processing. On the other hand, if the processing should not be terminated, the multi-layer image synthesis section 150 returns the processing to the step S31. The loop in the above described processing is repeated for every line or every several lines of the image.

Figure 5:
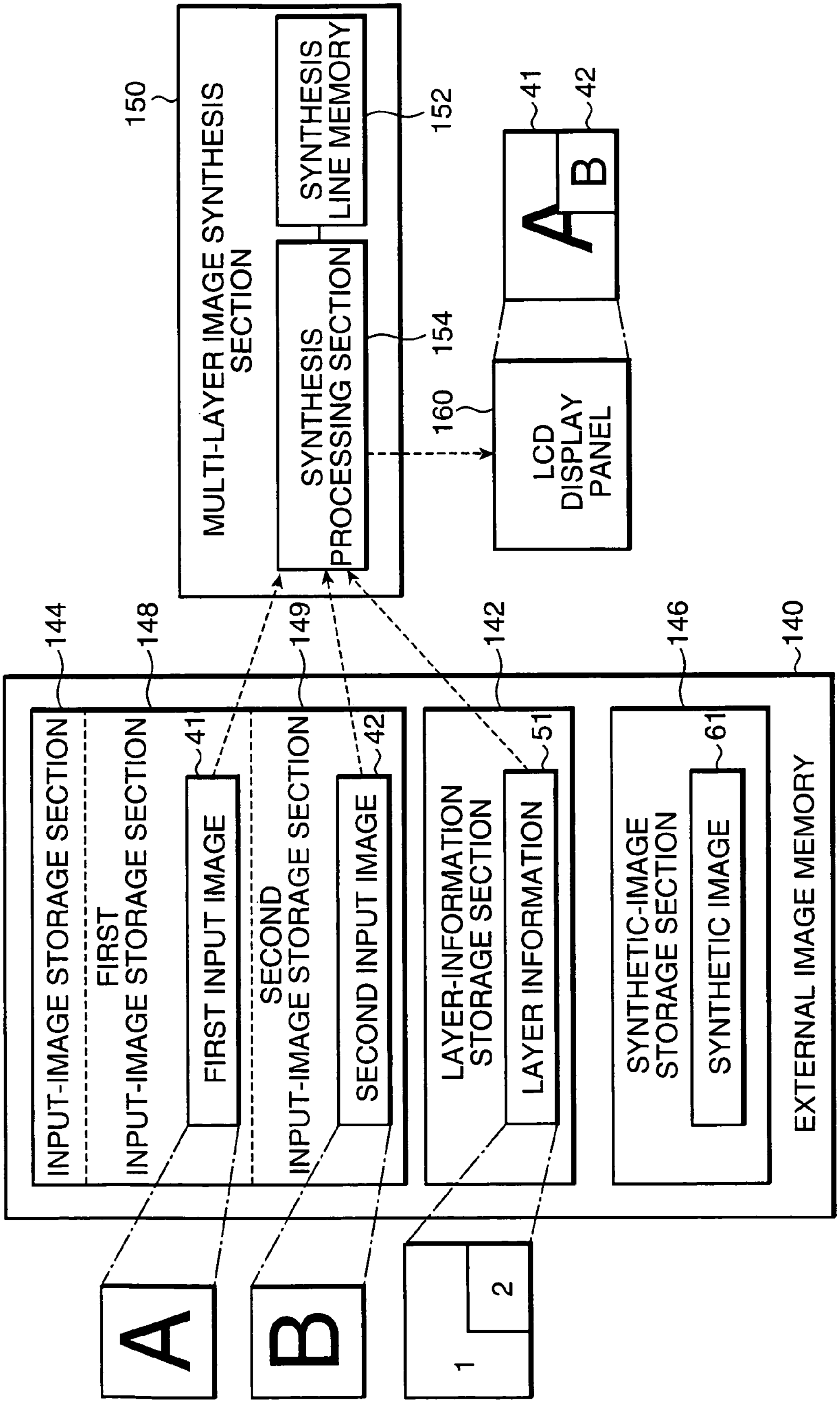
FIG. 5 is a representation, showing the operation of a synthesizing mode in the image synthesis section of FIG. 1.

FIG. 5 is a representation, showing the operation of a synthesizing mode in the image synthesis section 150. In the example of FIG. 5, as the input image 109, two kinds of images of a first input image 41 and a second input image 42 are stored in the input-image storage section 144. The first input image 41 is, for example, the party-side image 11, and the second input image 42 is, for example, the self-side image 12. In this case, the first input image 41 and the second input image 42 are, for example, a full-color natural image. In FIG. 5, for convenience, a character "A" is illustrated as the first input image 41, while a character "B" is illustrated as the second input image 42.

The kind and number of images which make up the input images 109 can be set and changed, for example, by the user's key operation. For example, either of the first input image 41 and the second input image 42 may also be a CG (or computer graphics) image which is created by a computer and then is inputted. In addition, the first input image 41 and the second input image 42 may also be either of a static image and a dynamic image, or another kind of image.

The input-image storage section 144 is provided with a first input-image storage section 148 which is a storage area for storing the first input image 41, and a second input-image storage section 149 which is a storage area for storing the second input image 42. The first input-image storage section 148 and the second input-image storage section 149 are each a memory space which is freely allocated within the external image memory 140 as a single RAM, according to the kind, number and size (i.e., data quantity) of images which make up the input images 109. This helps save the storage capacity of the input-image storage section 144. In contrast, inside of the input-image storage section 144, a memory space can also be fixedly secured which corresponds to the maximum size of the image that has the maximum number among the images which make up the input images 109.

Using the external image memory 140 as a single RAM in the form of time sharing, these memory spaces may also overlap at a part or the whole of them. If a memory space of a single RAM is designed to be allocated to each storage section 148 and 149, then the leading address of each allocated memory space is designated, so that either of the storage sections 148 and 149 can be chosen and used.

In the layer-information storage section 142, layer information 51 is stored which is written by the operation-mode switch section 128. As already described, the layer information 51 includes layout information and mode instruction information.

The synthetic-image storage section 146 stores a synthetic image 61, but synthetic-image storage section 146 is not used in the synthesizing mode. In the synthesizing mode, based on the layout information which is included in the layer information 51, the synthesis processing section 154 reads and synthesizes the first input image 41 and the second input image 42 from the input-image storage section 144. In the example of FIG. 5, the layout information gives an instruction to place and display the second input image 42 (shown by a number of "2") on top of a small area in the lower-right corner of the first input image 41 (shown by a number of "1"). In other words, the layout information gives an instruction for the layer of "1" which covers the whole display screen of the LCD display panel 160, and the layer of "2" which is located over the layer of "1" at the lower right of the display screen.

Figure 6:
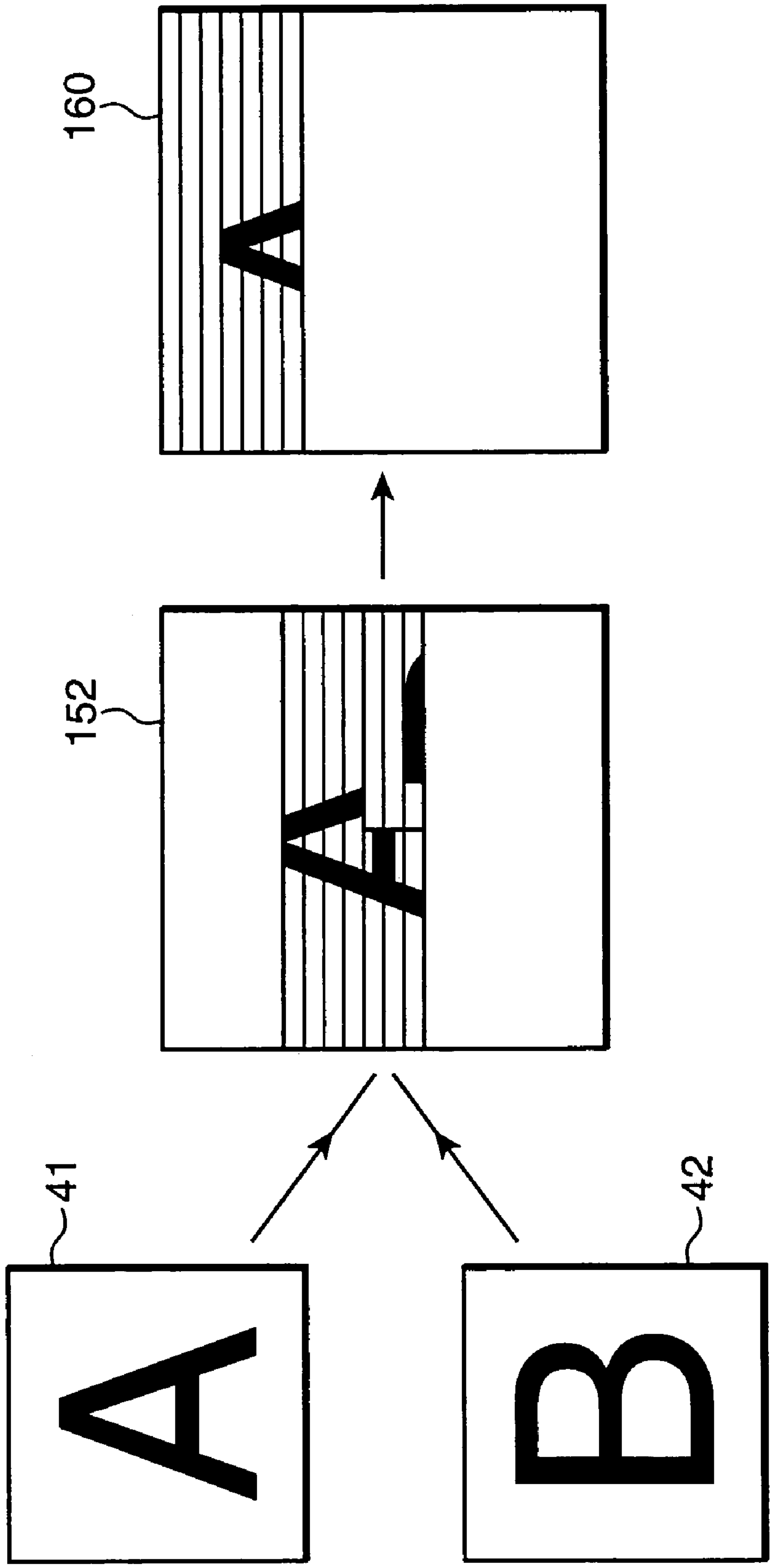
FIG. 6 is a representation, showing the operation of a synthesis processing section in FIG. 1.

FIG. 6 is a representation, showing the image synthesis processing of the synthesis processing section 154. As illustrated in FIG. 6, according to the layout information, the synthesis processing section 154 reads the first input image 41 and the second input image 42, selectively, for example, line by line from the input-image storage section 144. Then, it writes them in the synthesis line memory 152. The synthesis processing section 154 reads the first input image 41 in the area where the first input image 41 should be displayed. On the other hand, it reads the second input image 42 in the area where the second input image 42 should be displayed to overlap with the first input image 41. In the example of FIG. 6, the synthesis line memory 152 has a storage capacity of seven lines of the synthetic image. However, it is generally enough that it has a storage capacity of one or more lines.

The synthesis processing section 154 reads, one after another, a line of the synthetic image which is stored in the synthesis line memory 152, in the way of FIFO (or first input first out). Then, it outputs them to the LCD display panel 160. As a result, as illustrated in FIG. 5, an image which is obtained by enlarging the character "A" which is the first input image 41 is displayed over the entire display screen of the LCD display panel 160. In the lower-right area of the display screen, there is displayed an image which is obtained by adjusting, to a suitable size, the character "B" which is the second input image 42.

Figure 7:
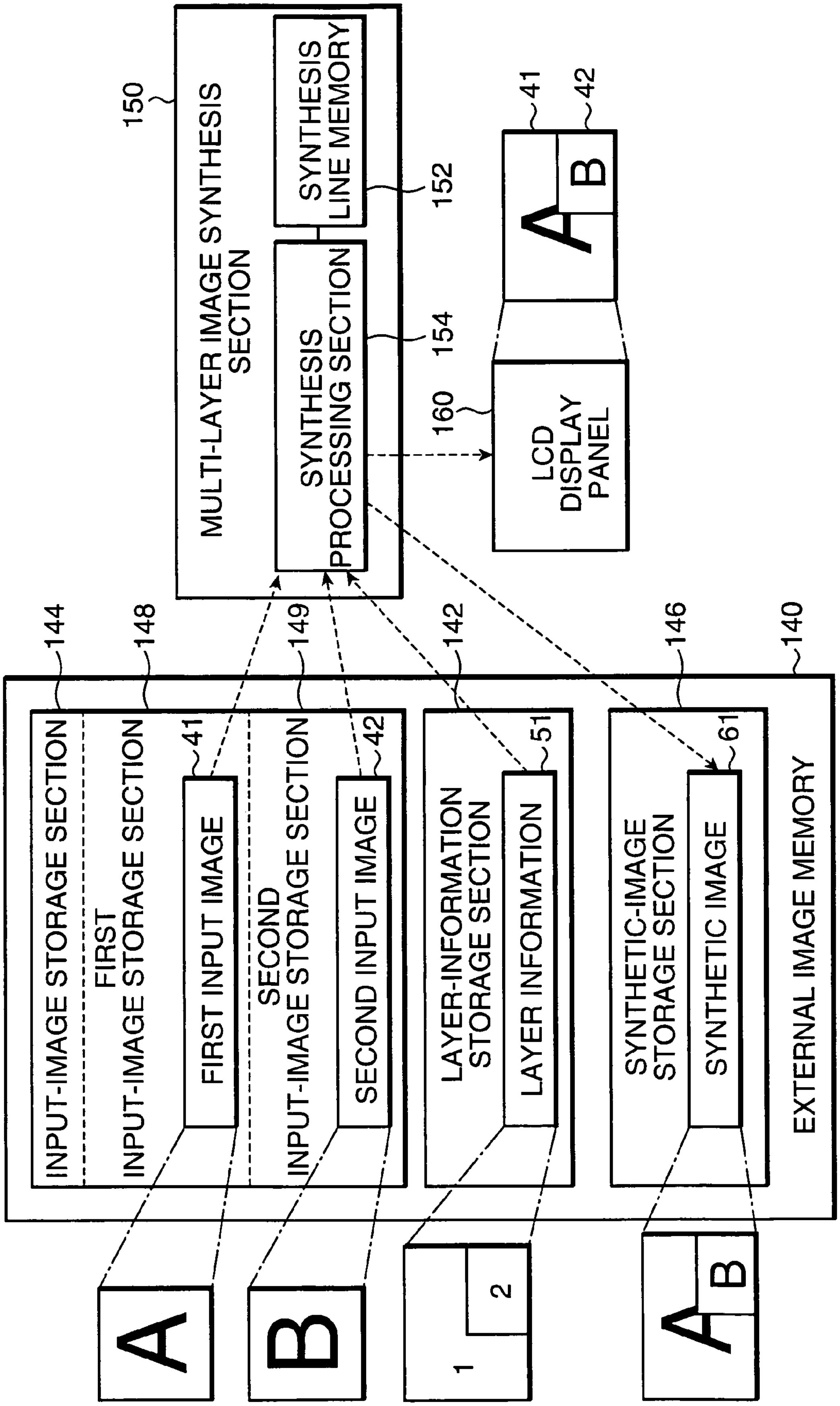
FIG. 7 is a representation, showing the operation of a synthesis writing mode in the image synthesis section of FIG. 1.

FIG. 7 is a representation, showing the operation of the synthesis writing mode in the image synthesis section 150. In the example of FIG. 7, in the same way as FIG. 5, as the input image 109, two kinds of images of the first input image 41 and the second input image 42 are stored in the input-image storage section 144. In the synthesis writing mode, in the same way as the synthesizing mode, based on the layout information which is included in the layer information 51, the synthesis processing section 154 reads and synthesizes the first input image 41 and the second input image 42 from the input-image storage section 144. Besides, as illustrated in FIG. 6, the synthesis processing section 154 reads, one after another, a line of the synthetic image which is stored in the synthesis line memory 152, in the way of FIFO (or first input first out). Then, it outputs them to the LCD display panel 160. As a result, a synthetic image which is illustrated in FIG. 7 is displayed in the LCD display panel 160.

In the synthesis writing mode, in addition to that, the synthesis processing section 154 further writes, one by one, a line of the synthetic image which is read from the synthesis line memory 152 in the synthetic-image storage section 146. As a result, the synthetic image 61 which is illustrated in FIG. 7 is stored in the synthetic-image storage section 146. The writing of the synthetic image 61 in the synthetic-image storage section 146 is executed in preparation for the reading mode which is expected following the synthesis writing mode.

Figure 8:
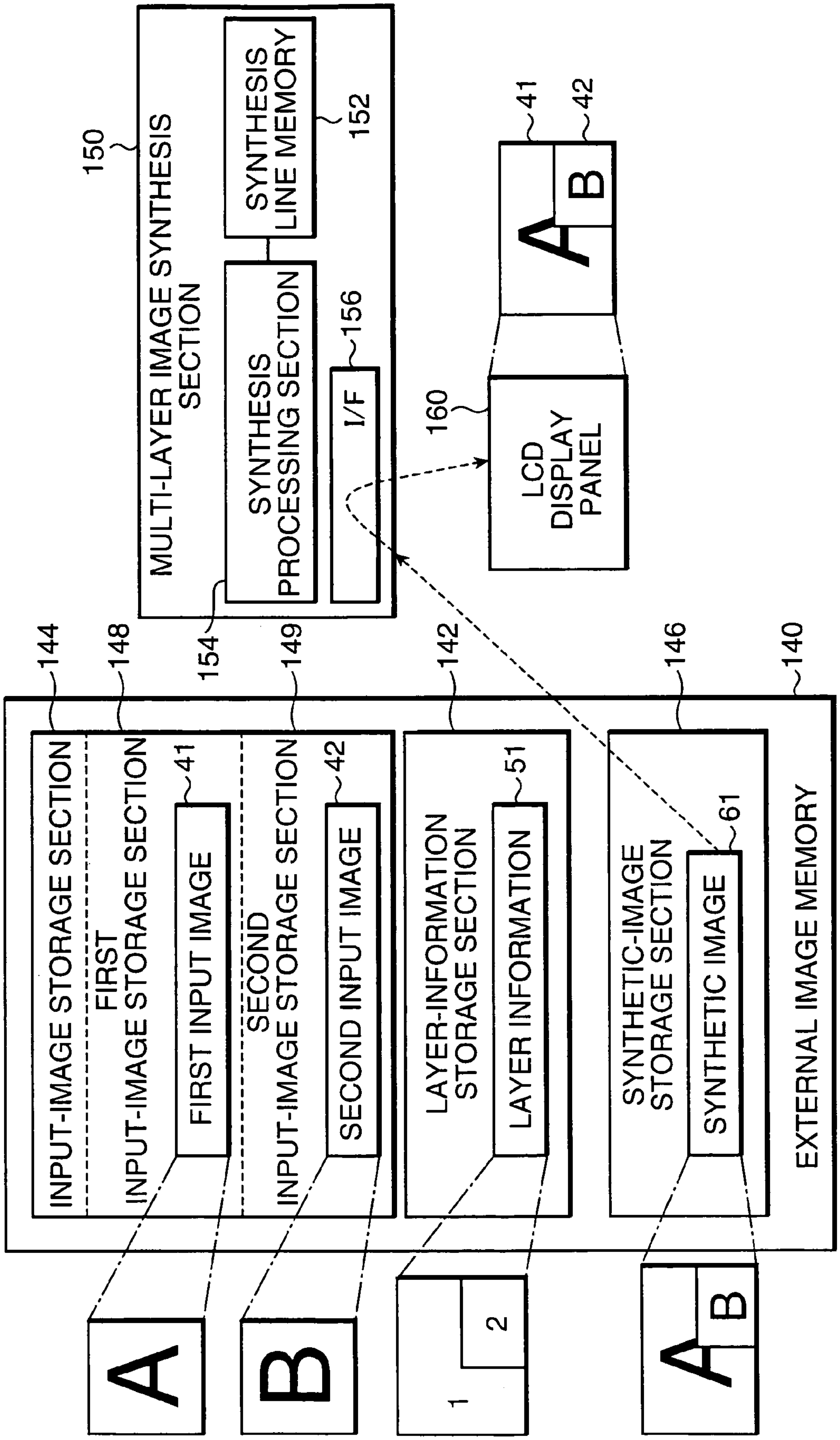
FIG. 8 is a representation, showing the operation of a reading mode in the image synthesis section of FIG. 1.

FIG. 8 is a representation, showing the operation of the reading mode in the image synthesis section 150. In the example of FIG. 8, in the same way as FIG. 5 and FIG. 7, as the input image 109, two kinds of images of the first input image 41 and the second input image 42 are stored in the input-image storage section 144. In the reading mode, the synthesis processing section 154 does not execute the image synthesis processing. On the other hand, the memory interface 156 reads the synthetic image 61 which is stored in the synthetic-image storage section 146. Then, it outputs them to the LCD display panel 160. As a result, a synthetic image which is illustrated in FIG. 8 is displayed in the LCD display panel 160.

Figure 9:
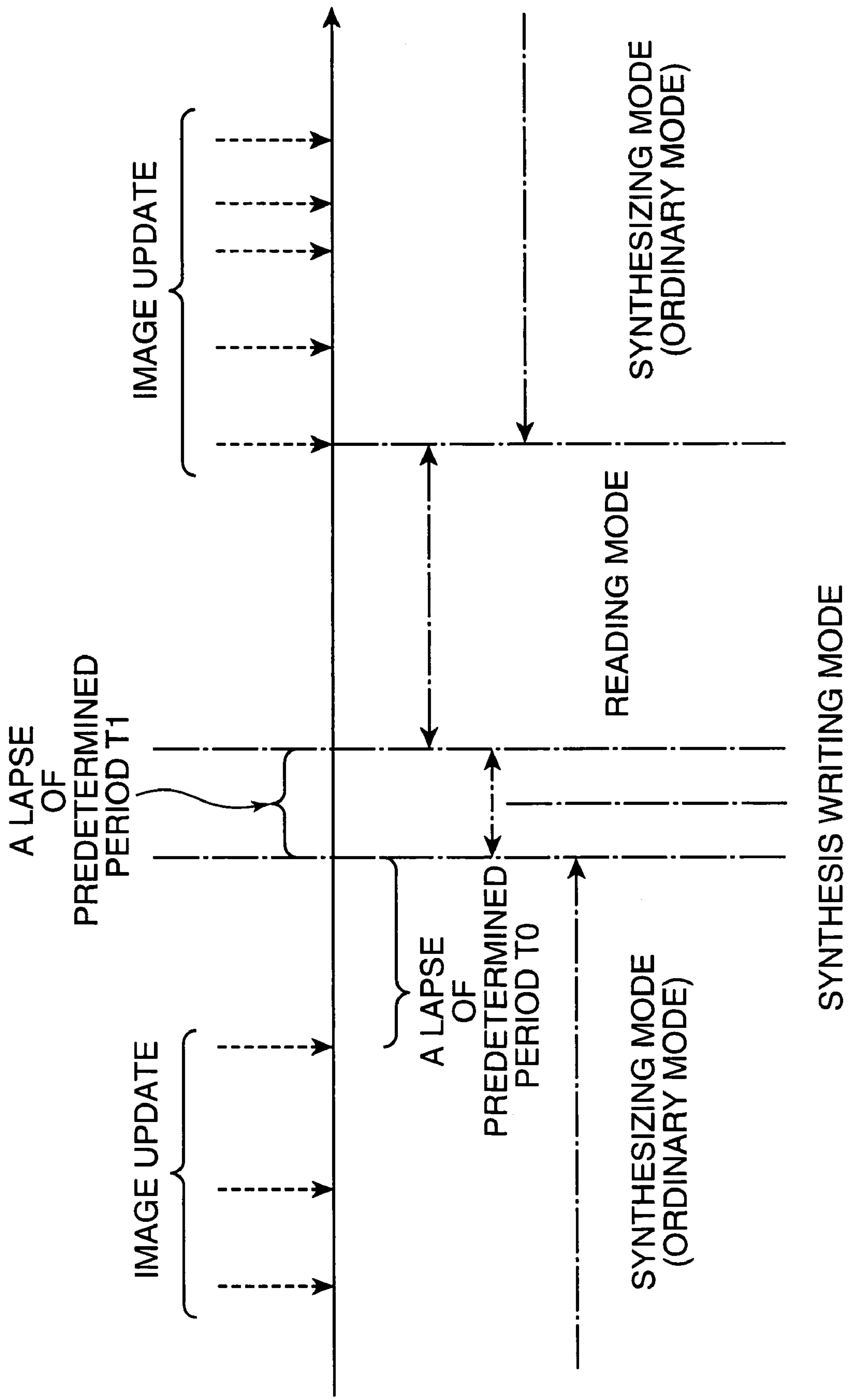
FIG. 9 is a timing chart, illustrating the transition of operation modes in the image synthesis section of FIG. 1.

FIG. 9 is a timing chart, illustrating the transition of operation modes in the image synthesis section 150. Hereinafter, a power consumption in each operation mode will be described with reference to the timing chart. As shown on the left side of FIG. 9, during an ordinary period when the input image 109 is updated within the first predetermined period T0 and thus the image which is displayed in the LCD display panel 160 is updated, the synthesizing mode is chosen and set as an ordinary mode. Consequently, the input images 109 are synthesized, and a synthetic image which has been obtained in the synthesis processing is displayed in the LCD display panel 160.

This power consumption in the synthesizing mode is calculated, for example, in the following way. The power consumption which is calculated herein is the power which is consumed by memory access in the external image memory 140 and the multi-layer image synthesis section 150. The power consumption in the other parts, such as the LCD display panel 160 and the layer-information creation section 130, is excluded from the subject of the calculation. This is because they do not have a close correlation with the operation mode.

Figure 10:
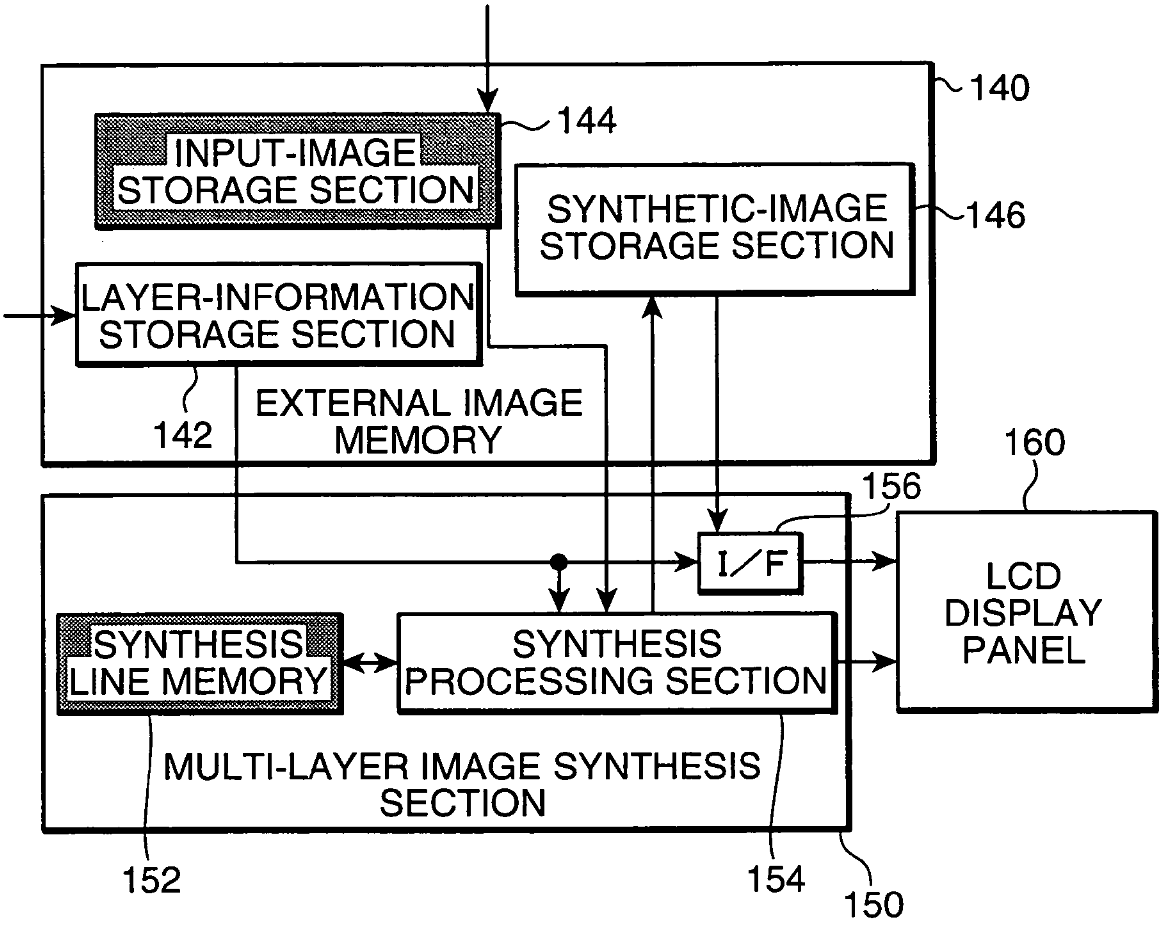
FIG. 10 is a block diagram, showing a memory to be accessed in the synthesizing mode in the apparatus of FIG. 1.

With respect to memory access in the synthesizing mode, reading access takes place to the input-image storage section 144 of the external image memory 140. In addition, writing access and reading access take place to the synthesis line memory 152 of the multi-layer image synthesis section 150. Specifically, in the synthesizing mode, in the block diagram of FIG. 10, memory access takes place to the hatched parts. The power consumption in the synthesizing mode is the total of the power consumption by such access. The power consumption by reading access to the input-image storage section 144 of the external image memory 140 is the same as the power consumption by reading access to the synthetic-image storage section 146 of the external image memory 140. If this power consumption is expressed as W140, W140 is given by a formula 1.

$$W140 = A1 \times V1 \times K3 + fp1 \times Ip1 \times C1 \times V1^2 \times (Dbpp \times K1 + Abpp \times K2) \quad \text{Formula 1}$$

In addition, the power consumption by reading access to the synthesis line memory 152 of the multi-layer image synthesis section 150 is the same as the power consumption by writing access to it. If this power consumption is expressed as W150, W150 is given by a formula 2.

$$W150 = A2 \times V2 \times K4 \quad \text{Formula 2}$$

In the formula 1, reference numeral and character A1 designates an operating current (A) of a memory element which configures the input-image storage section 144 and the synthetic-image storage section 146. V1 denotes a voltage (V) which is supplied to the memory element. K3 is a frequency with which the data that is stored in the memory element changes, which is given by a formula 3.

$$K3 = Ip1 \times fp1 / f3 \quad \text{Formula 3}$$

In the formula 3, reference numeral and character Ip1 designates the number of pixels (or picture elements) of an image or a display image which is displayed in the LCD display panel 160. fp1 denotes the number of times at which the image is updated for a second in the LCD display panel 160. f3 is the maximum number of pixels which the multi-layer image synthesis section 150 can process for a second.

Furthermore, in the formula 1, reference numeral and character C1 designates a stray capacitance (F) of the part at which the external image memory 140 is connected to the multi-layer image synthesis section 150. Dbpp denotes a data-bus width of the external image memory 140. Abpp is an address-bus width of the external image memory 140. K1 designates a data-bus value of the external image memory 140 or a frequency with which the data changes on the data bus. K2 denotes a frequency with which the address-bus value of the external image memory 140 changes. Assuming A1 to be 30 mA, V1 to be 1.8V, Ip1 to be 240×320=76,800 pixels, fp1 to be 60 frames/second, f3 to be 100M pixels, C1 to be 10 pF, Dbpp to be 32, Abpp to be 16, K1 to be ½ and K2 to be 1/16, if it is calculated using the formula 1 and the formula 3, W140 becomes approximately 5 mW.

Moreover, in the formula 2, reference numeral and character A2 designates an operating current (A) of a memory element which configures the synthesis line memory 152 of the multi-layer image synthesis section 150. V2 denotes a voltage (V) which is supplied to the memory element. K4 is a frequency with which the data that is stored in the memory element changes, which is given by a formula 4.

$$K4 = Ip2 \times fp2 / f2 \quad \text{Formula 4}$$

In the formula 4, reference numeral and character Ip2 designates the number of pixels on one screen which the multi-layer image synthesis section 150 processes. Fp2 denotes the number of times at which the multi-layer image synthesis section 150 updates an image for a second in the LCD display panel 160. f2 is the maximum number of pixels which the multi-layer image synthesis section 150 can process for a second. Assuming A2 to be 60 mA, V2 to be 1.8V, Ip2 to be 240×320=76,800 pixels, fp2 to be 60 frames/second and f2 to be 100M pixels, if it is calculated using the formula 2 and the formula 4, W150 becomes approximately 5 mW.

As described above, the power consumption W140 by reading access to the input-image storage section 144 of the external image memory 140 is approximately 5 mW. In addition, the power consumption W150 by writing access to the synthesis line memory 152 of the multi-layer image synthesis section 150 is also approximately 5 mW. Besides, the power consumption W150 by reading access to the synthesis line memory 152 is also approximately 5 mW. If these are totaled, the sum becomes approximately 15 mW. As a result, the power consumption in the synthesizing mode is approximately 15 mW.

Moving back to FIG. 9, the assumption is given that the first predetermined period T0 has elapsed with no update since the input image 109 was updated latest. At this time, as shown in FIG. 9, the operation mode is switched from the synthesizing mode to the synthesis writing mode. As described above, the first predetermined period T0 is a predetermined period of time and the time which is counted by the non-update counter 126. As described above, the operation-mode switch section 128 chooses a new operation mode. Then, mode instruction information which gives an instruction for the chosen operation mode is inputted in the layer-information storage section 142. Thereby, the operation mode is switched. Consequently, the image synthesis processing, the synthetic image writing processing and the display processing are executed in the synthesis writing mode.

Figure 11:
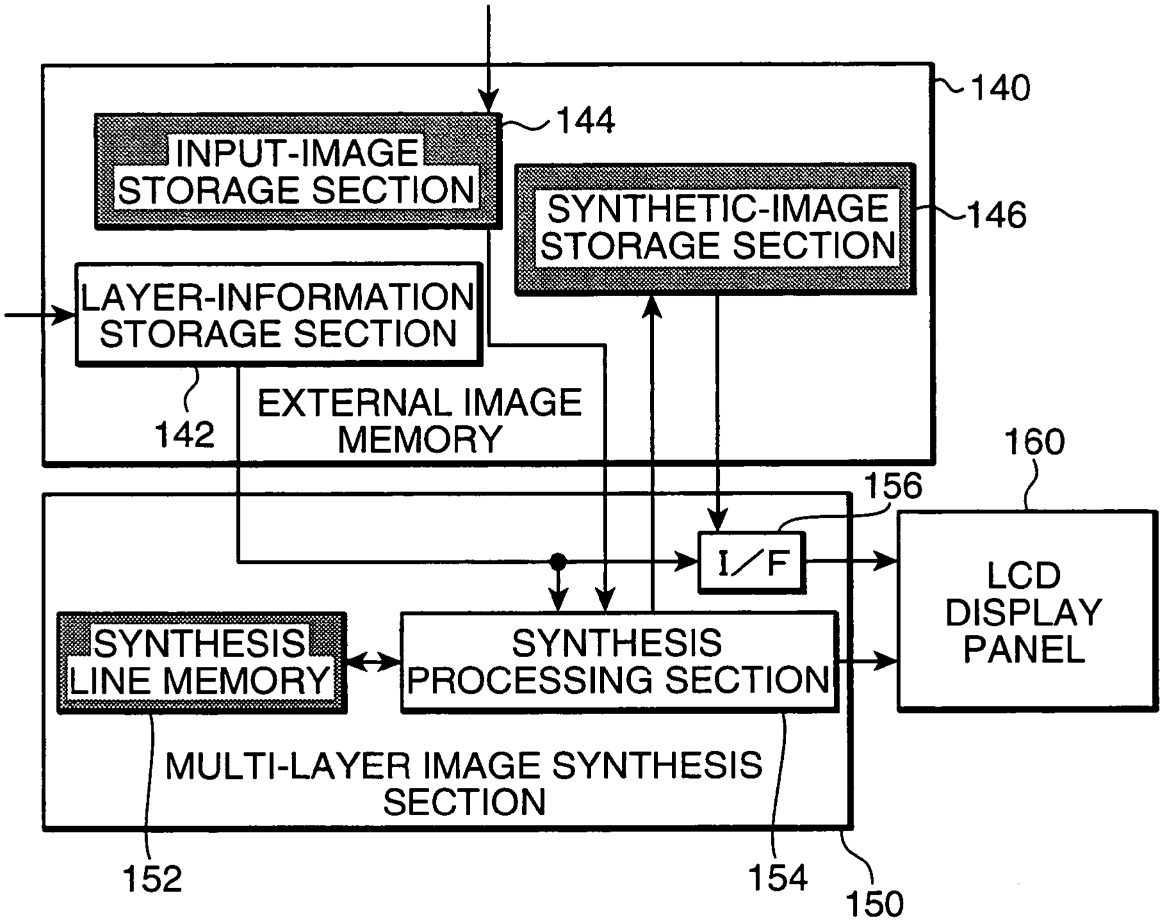
FIG. 11 is a block diagram, showing a memory to be accessed in the synthesis writing mode in the apparatus of FIG. 1.

As described above, the synthesis writing mode is an operation mode in which the synthetic image 61 which has been generated in the image synthesis processing is displayed in the LCD display panel 160 and is simultaneously stored in the synthetic-image storage section 146. Hence, in the synthesis writing mode, in addition to the memory access which is executed in the synthesizing mode, the writing access is executed to the synthetic-image storage section 146. In other words, in the synthesis writing mode, in the block diagram of FIG. 11, the memory access is executed to the hatched parts. The power consumption in the synthesis writing mode becomes the total of the power consumption by such access.

As described above, the power consumption by reading access to the input-image storage section 144 of the external image memory 140 is the same as the power consumption by reading access to the synthetic-image storage section 146 of the external image memory 140. In addition, the power consumption by reading access to the synthetic-image storage section 146 of the external image memory 140 is the same as the power consumption by writing access to it. Therefore, if this power consumption is expressed as W140, W140 is given by the formula 1. Thus, if the power consumption in the synthesis writing mode is calculated on the same assumption as that in the synthesizing mode, it becomes some 20 mW by adding about 5 mW to around 15 mW which is the power consumption in the synthesizing mode.

Returning again to FIG. 9, the assumption is given that the second predetermined period T1 has elapsed since the processing in the synthesis writing mode started with no update of the input image 109. At this time, as shown in FIG. 9, the operation mode is switched from the synthesis writing mode to the reading mode. As described above, the second predetermined period T1 is, in the same way as the first predetermined period T0, a predetermined period of time and the time which is counted by the non-update counter 126.

As described above, the reading mode is an operation mode in which the synthetic image is read from the synthetic-image storage section 146 and is displayed in the LCD display panel 160. In the reading mode, the input images 109 which have not been updated, or the first input image 41 and the second input image 42 which have not been updated, are not sent to the multi-layer image synthesis section 150. Or, even if they are sent to the multi-layer image synthesis section 150, they are not received by the multi-layer image synthesis section 150. Or, even if they are received by the multi-layer image synthesis section 150, they are not used for any processing.

Figure 12:
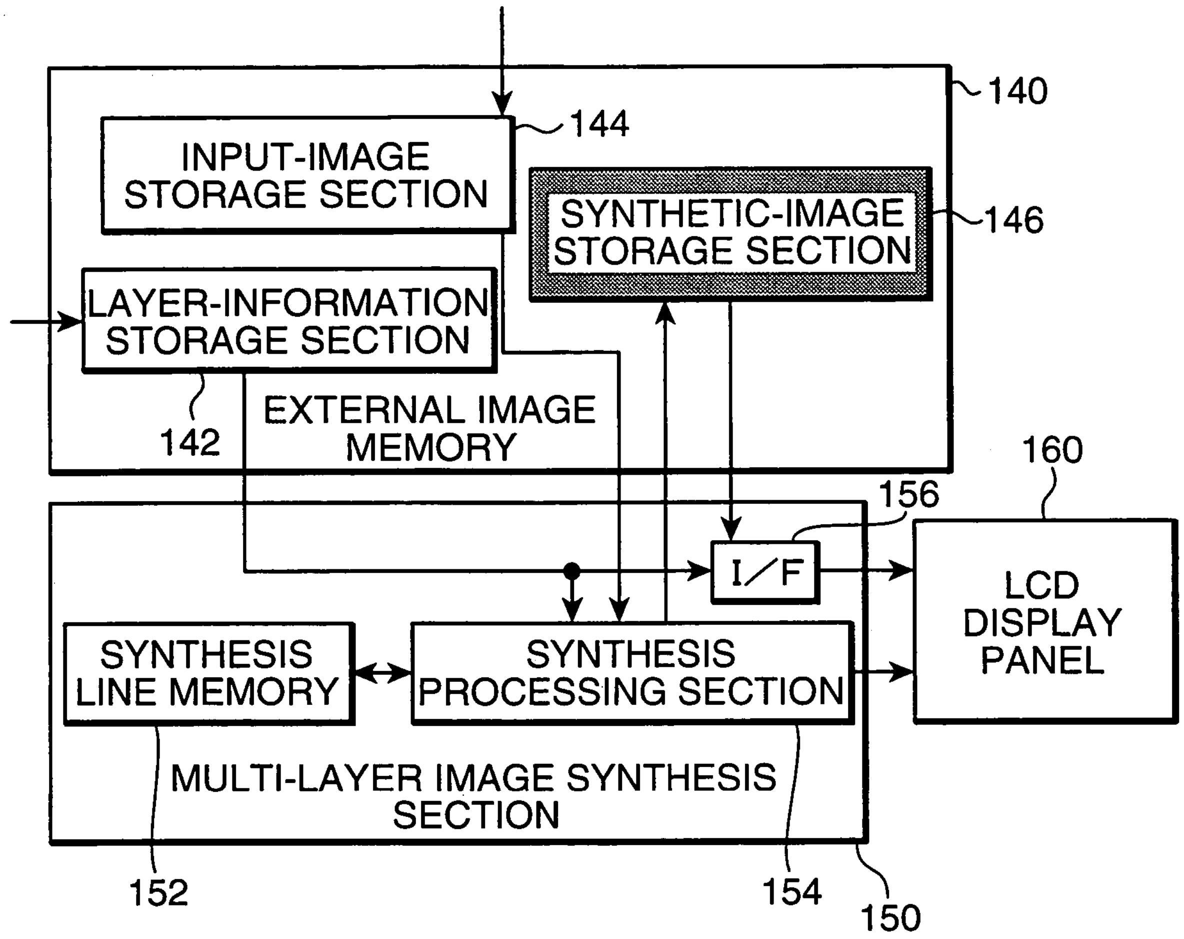
FIG. 12 is a block diagram, showing a memory to be accessed in the reading mode in the apparatus of FIG. 1.

In the reading mode, reading access is given to the synthetic-image storage section 146. However, reading access is not given to the input-image storage section 144 and the layer-information storage section 142. Writing and reading access is not given to the synthesis line memory 152, either. In other words, in the reading mode, in the block diagram of FIG. 12, memory access is executed to the hatched part. Therefore, in the reading mode, the power consumption which is required for the memory access can be largely saved.

The power consumption in the reading mode is calculated, for example, in the following way. The power consumption which is calculated herein is also the power which is consumed by memory access in the external image memory 140 and the multi-layer image synthesis section 150. As described above, the memory access in the reading mode is limited to reading access to the synthetic-image storage section 146 of the external image memory 140. Hence, the power consumption to be calculated is limited to the power consumption by this memory access.

As described above, the power consumption by reading access to the input-image storage section 144 of the external image memory 140 is the same as the power consumption by reading access to the synthetic-image storage section 146 of the external image memory 140. Thus, if this power consumption is expressed as W140, W140 is given by the formula 1. Therefore, if the power consumption is calculated on the same assumption as that in the synthesizing mode, as described above, it becomes about 5 mW. In other words, it can be seen that the power consumption in the reading mode is around one-third the power consumption in the synthesizing mode. In this way, when the image which should be displayed is not updated, the mobile-phone display section 100 can save power in the stage where a synthetic image is obtained.

As shown on the right side of FIG. 9, the reading mode continues until the input image 109 is freshly updated. As described above, the input-image update decision section 122 detects that the input image 109 has been updated. As described already, if the input-image update decision section 122 detects that the input image 109 has been updated, as the decision on whether or not the input image 109 has been updated, it sends information which indicates "updated" to the non-update counter control section 124. Then, the non-update counter control section 124 which has accepted this decision resets the value of the non-update counter 126, for example, to "0". As a result, the operation-mode switch section 128 chooses and sets the synthesizing mode.

Second Embodiment

Figure 13:
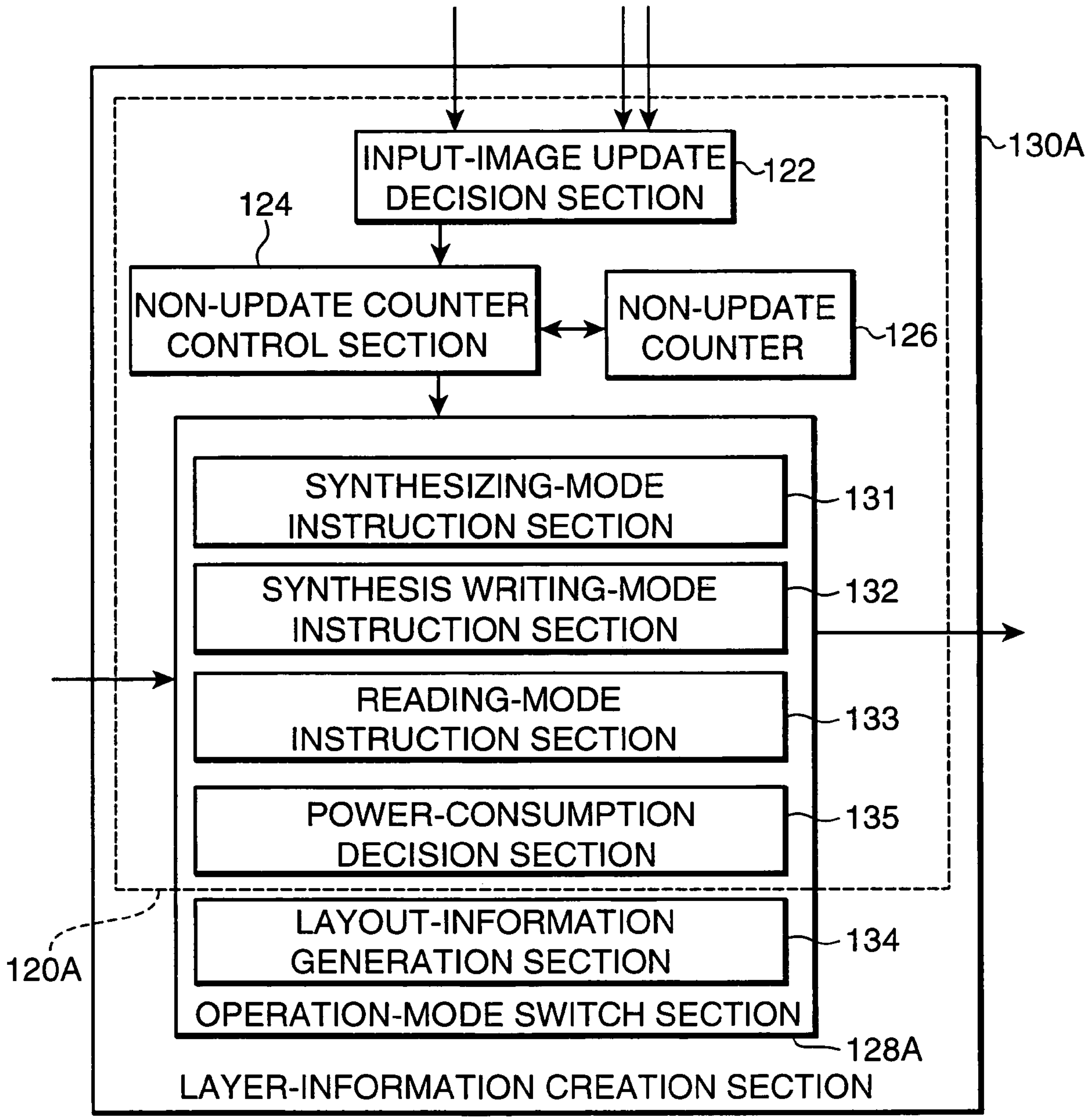
FIG. 13 is a block diagram, showing the configuration of a part of an image synthesis display apparatus according to a second embodiment of the present invention.

FIG. 13 is a block diagram, showing the configuration of a part of an image synthesis display apparatus according to a second embodiment of the present invention. Similar to the first embodiment, the image synthesis display apparatus according to this embodiment is also embodied as a mobile-phone display section which is incorporated in a cellular phone. In the image synthesis display apparatus according to this embodiment, the layer-information creation section 130 is replaced with a layer-information creation section 130A shown in FIG. 13. In that respect, it is different from the mobile-phone display section 100. To an operation-mode switch section 128A which is provided in the layer-information creation section 130A, a power-consumption decision section 135 is added, which is different from the operation-mode switch section 128 of FIG. 1. The power-consumption decision section 135 compares the power consumption in the synthesizing mode with the power consumption in the reading mode. In FIG. 13, a mode control section 120A which gives an instruction for an operation mode to the multi-layer image synthesis section 150 is shown by a dotted-line block. The mode control section 120A corresponds to a specific example of the mode control section according to the present invention.

Figure 14:
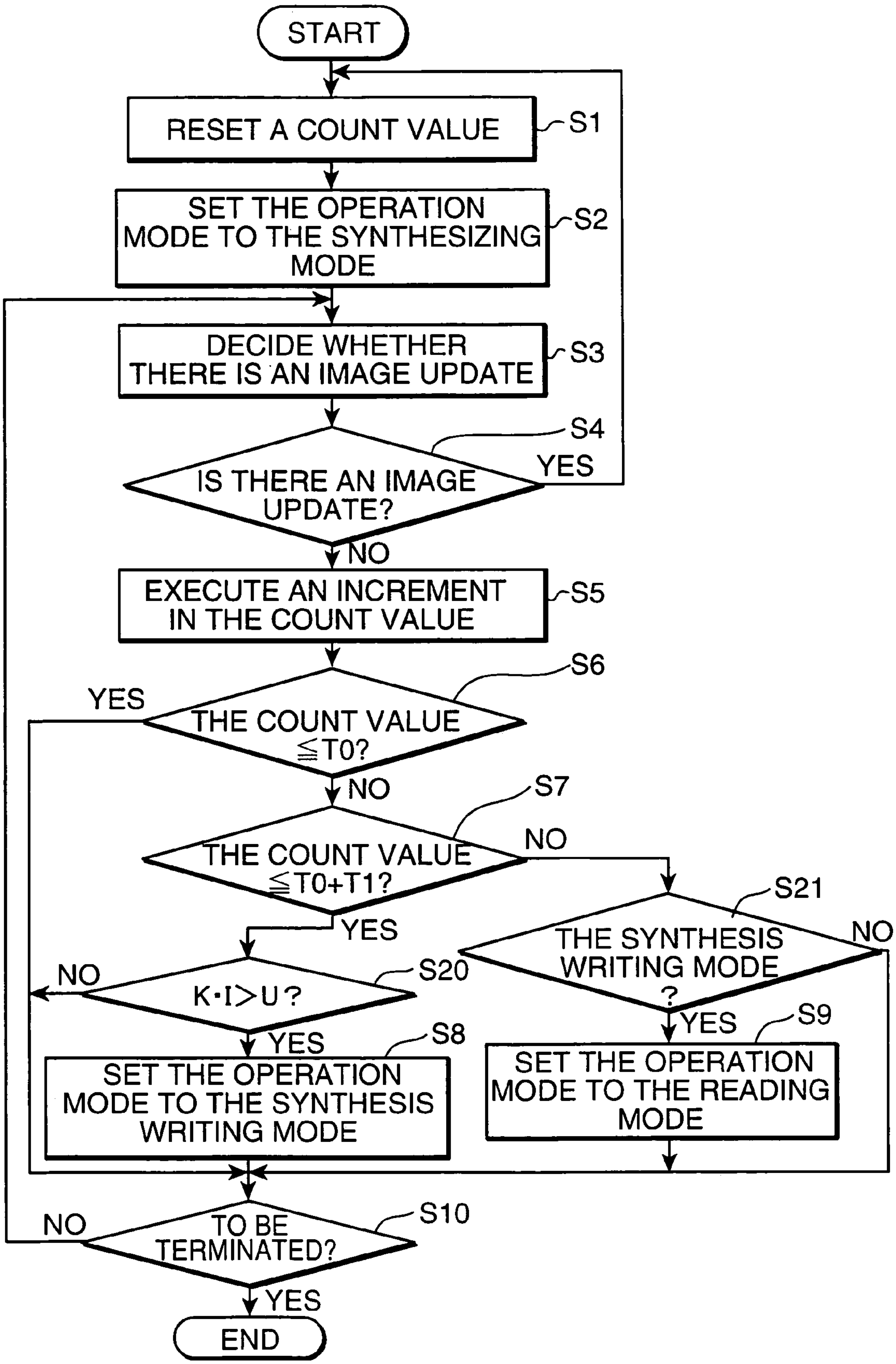
FIG. 14 is a flow chart, showing the operational procedure of a layer-information creation section in FIG. 13.

FIG. 14 is a flow chart, showing the operational procedure of the layer-information creation section 130A. In the operational procedure of the layer-information creation section 130A, a process (Step S20) of the power-consumption decision section 135 making a comparison of a power consumption is inserted between the step S7 and the step S8. In addition, a process (Step S21) of the non-update counter control section 124 deciding an operation mode is inserted between the step S7 and the step S9. In those respects, it is different from the operational procedure of the layer-information creation section 130 shown in FIG. 3.

In the decision which has been made by the non-update counter control section 124 in the step S7, If the count value is equal to, or below, the sum of the first predetermined period T0 and the second predetermined period T1 (Yes at the step S7), the non-update counter control section 124 sends that decision to the operation-mode switch section 128. Based upon the decision, the power-consumption decision section 135 compares the power consumption in the synthesizing mode with the power consumption in the reading mode (Step S20). In further detail, the power-consumption decision section 135 evaluates a first power consumption which is necessary for the multi-layer image synthesis section 150 to read the input images 109 from the input-image storage section 144 the input-image storage section and to synthesize them, and a second power consumption which is necessary for the multi-layer image synthesis section 150 to read the synthetic image from the synthetic-image storage section 146. Then, it decides whether or not the first power consumption is more than the second power consumption.

As can be seen from the above described example of the numerical values which are obtained based on the formulas 1 to 4, the first power consumption is ordinarily more than the second power consumption. However, there can be a case where the size of the first input image 41, the second input image 42 or the like which makes up the input images 109 is small and its data quantity is small, while these images should be enlarged and displayed in the LCD display panel 160. In such a case, the data quantity of the input images 109 may become much smaller than the data quantity of the synthetic image. Depending upon the difference in the data quantity, the first power consumption can be less than the second power consumption.

The power-consumption decision section 135 evaluates the power consumption which depends upon the data quantity, and makes a comparison. For this purpose, the above described assumption may be put aside that the power consumption by reading access to the input-image storage section 144 is the same as the power consumption by writing and reading access to the synthetic-image storage section 146. In other words, the data quantity is taken into account in each piece of access, and then, the formulas 1 to 4 are individually applied. Thereby, the first and second power consumptions can be evaluated.

As a simpler evaluation procedure, the first power consumption can be evaluated as a quantity ($a \times I$) proportional to a data quantity (I) of the input image 109 which is stored in the input-image storage section 144. On the other hand, the second power consumption can be evaluated as a quantity ($b \times U$) proportional to a data quantity (U) of the synthetic image 109 which should be written in the synthetic-image storage section 146. Using this procedure, the power-consumption decision section 135 can evaluate the first and second power consumptions within a short period of time. The power-consumption decision section 135 can detect the data quantity (I), for example, from a change in the address value of the input-image storage section 144. For example, based on layout information which is generated by the layout-information generation section 134, it can detect the data quantity (U). The data quantities (I), (U) are evaluated, for example, in the unit of a byte.

In the synthesizing mode, the multi-layer image synthesis section 150 handles the input images 109 which are stored in the input-image storage section 144. Therefore, the first power consumption can be approximately evaluated as the quantity which is proportional to the data quantity of the input image 109. Similarly, in the reading mode, the multi-layer image synthesis section 150 handles the synthetic image which is stored in the synthetic-image storage section 146. Therefore, the second power consumption can be approximately evaluated as the quantity which is proportional to the data quantity of the synthetic image.

Using an experiment, a simulation or a theoretical calculation, proportional coefficients (a) and (b) can be obtained in advance in terms of the individual external image memories 140 and synthesis line memories 152. The contents of processing in the synthesizing mode are different from those in the reading mode. Thus, the proportional coefficient (a) is generally different from the proportional coefficient (b). Using such an approximate proportional correlation between a power consumption and a data quantity, the power-consumption decision section 135 can evaluate the first and second power consumptions relatively precisely and within a short period of time.

The power-consumption decision section 135 compares the first power consumption with the second power consumption. Hence, instead of calculating $a \times I$ and $b \times U$, the power-consumption decision section 135 may also evaluate the first power consumption as $K \times I$ using another proportional coefficient (K) and the second power consumption as U. The proportional coefficient K has a relation of $K=a/b$. In an ordinary apparatus configuration, the proportional coefficient K is a positive value of one or below. For example, it is around ½. Even in this case, the first and second power consumptions are also evaluated as the quantity which is proportional to the data quantity. In the step S20 of FIG. 14, an example is shown in which the proportional coefficient (K) is used.

If the decision of $K \cdot I > U$ is made at the step S20, in other words, if the first power consumption is above the second power consumption (YES at the step S20), the synthesis writing-mode instruction section 132 sets, to the synthesis writing mode, the operation mode of the multi-layer image synthesis section 150 (Step S8). Specifically, the synthesis writing-mode instruction section 132 writes mode instruction information which gives an instruction for the synthesis writing mode in the layer-information storage section 142. On the other hand, if the decision of $K \cdot I \leqq U$ is made at the step S20, in other words, if the first power consumption is equal to, or below, the second power consumption (YES at the step S20), then without setting the operation mode to the synthesis writing mode, the processing shifts to the step S10.

At the step S7, if the decision is made that the count value is above the sum of the first predetermined period T0 and the second predetermined period T1 (No at the step S7), then on the condition that the operation mode is already the synthesis writing mode (Yes at the step S21), the reading-mode instruction section 133 sets, to the reading mode, the operation mode of the multi-layer image synthesis section 150 (Step S9). Specifically, the reading-mode instruction section 133 writes mode instruction information which gives an instruction for the reading mode in the layer-information storage section 142.

Hence, in the image synthesis display apparatus according to this embodiment, if the input image 109 which is stored in the input-image storage section 144 is not updated and the first predetermined period T0 elapses, then on the condition that the evaluation result can be obtained of the fact that the power consumption in the reading mode becomes less than that in the synthesizing mode, the operation mode shifts from the synthesizing mode to the synthesis writing mode as a preparatory stage of the reading mode. Thereafter, if there has still been no update of the input image 109 even when the second predetermined period T1 elapses, the operation mode shifts to the reading mode. Therefore, depending upon the quantity of data to be processed in each operation mode, there is a case in which shifting from the synthesizing mode to the reading mode is disadvantageous in respect of power saving. In such a case, even if the input image 109 is not updated beyond the first predetermined period T0, the operation mode is not shifted and remains in the synthesizing mode. This presents a greater power-saving effect.

Third Embodiment

Figure 15:
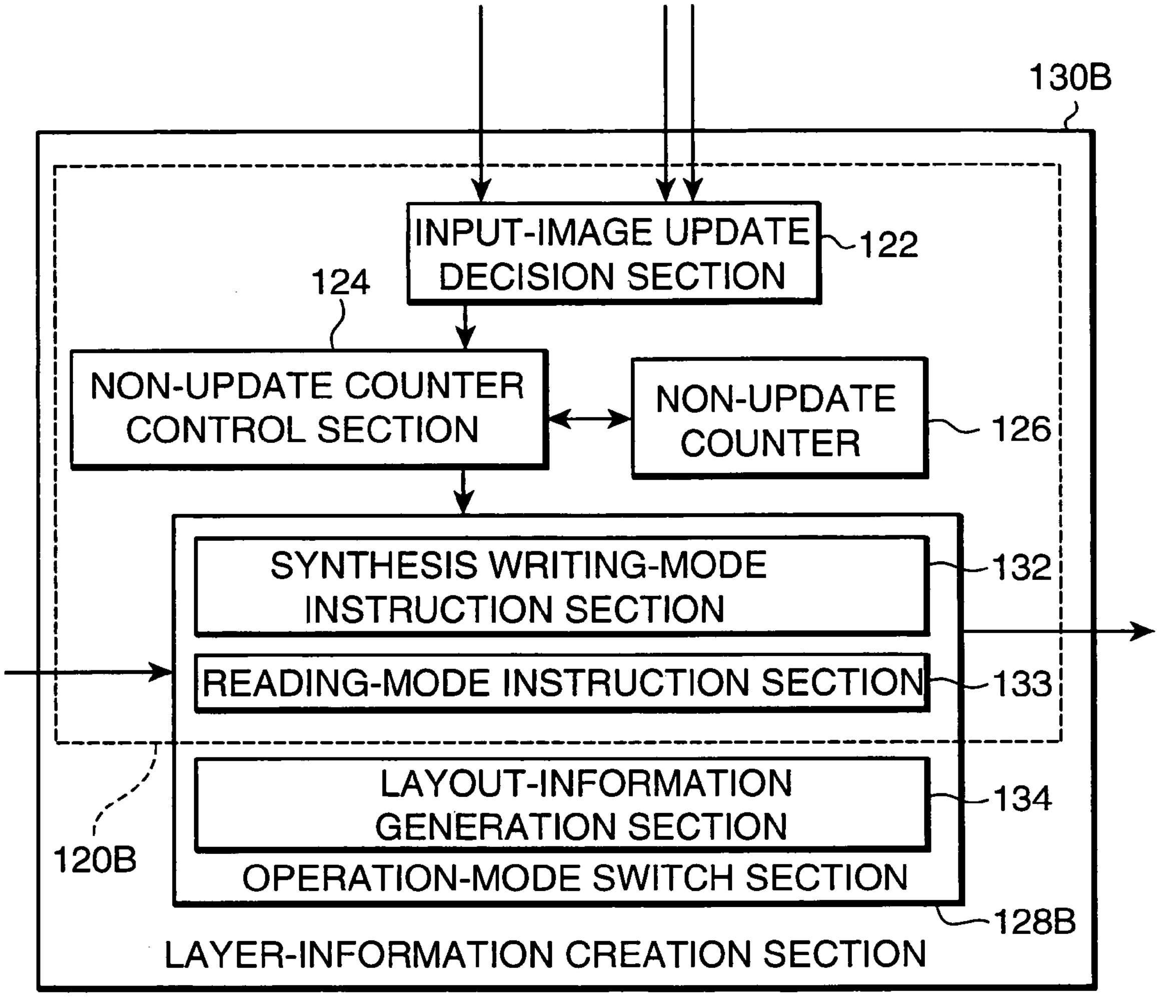
FIG. 15 is a block diagram, showing the configuration of a part of an image synthesis display apparatus according to a third embodiment of the present invention.

FIG. 15 is a block diagram, showing the configuration of a part of an image synthesis display apparatus according to a third embodiment of the present invention. Similar to the first and second embodiments, the image synthesis display apparatus according to this embodiment is also embodied as a mobile-phone display section which is incorporated in a cellular phone. In the image synthesis display apparatus according to this embodiment, the layer-information creation section 130 is replaced with a layer-information creation section 130B shown in FIG. 15. In that respect, it is different from the mobile-phone display section 100. In an operation-mode switch section 128B which is provided in the layer-information creation section 130B, the synthesizing-mode instruction section 131 is removed, which is different from the operation-mode switch section 128 of FIG. 1. In FIG. 15, a mode control section 120B which gives an instruction for an operation mode to the multi-layer image synthesis section 150 is shown by a dotted-line block. The mode control section 120B corresponds to a specific example of the mode control section according to the present invention.

Figure 16:
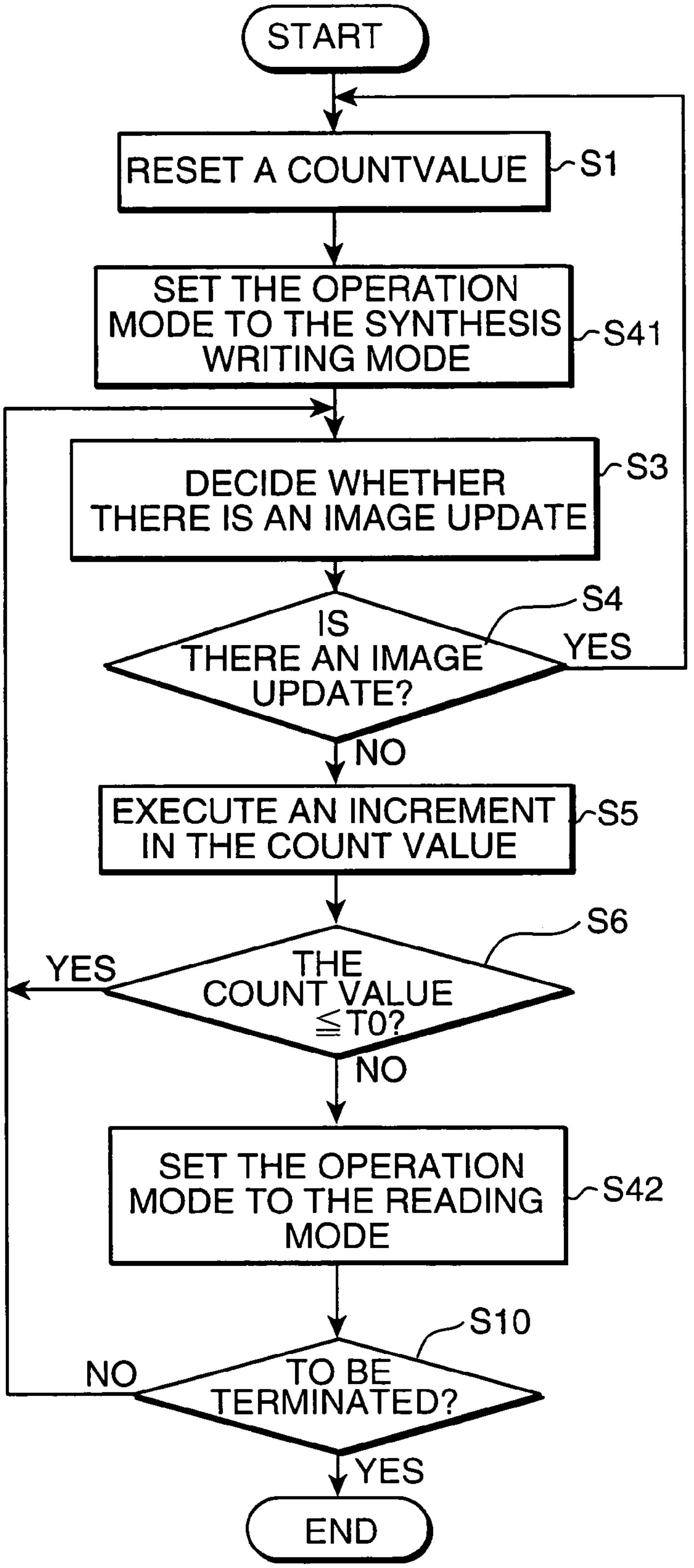
FIG. 16 is a flow chart, showing the operational procedure of a layer-information creation section in FIG. 15.

FIG. 16 is a flow chart, showing the operational procedure of the layer-information creation section 130B. In the operational procedure of the layer-information creation section 130B, the step S2 is replaced with a step S41, and the steps S7 to S9 is replaced with a step S42. In those respects, it is different from the operational procedure of the layer-information creation section 130 shown in FIG. 3. In the step S1, the non-update counter control section 124 resets the count value of the non-update counter 126. Then, based upon that information which has been sent from the non-update counter control section 124, the synthesis writing-mode instruction section 132 sets, to the synthesis writing mode, the operation mode of the multi-layer image synthesis section 150 (Step S41). Specifically, the synthesis writing-mode instruction section 132 writes mode instruction information which gives an instruction for the synthesis writing mode in the layer-information storage section 142. Afterward, the processing of the step S3 is executed.

At the step S6, if the non-update counter control section 124 decides that the count value is above the predetermined period T0 (No at the step S6), then based on the decision which has been sent from the non-update counter control section 124, the reading-mode instruction section 133 sets, to the reading mode, the operation mode of the multi-layer image synthesis section 150 (Step S42). Specifically, the reading-mode instruction section 133 writes mode instruction information which gives an instruction for the reading mode in the layer-information storage section 142. Thereafter, the processing goes to the step S10. On the other hand, at the step S6, if the non-update counter control section 124 decides that the count value is the predetermined period T0 or below (Yes at the step S6), the processing shifts to the step S3.

Figure 17:
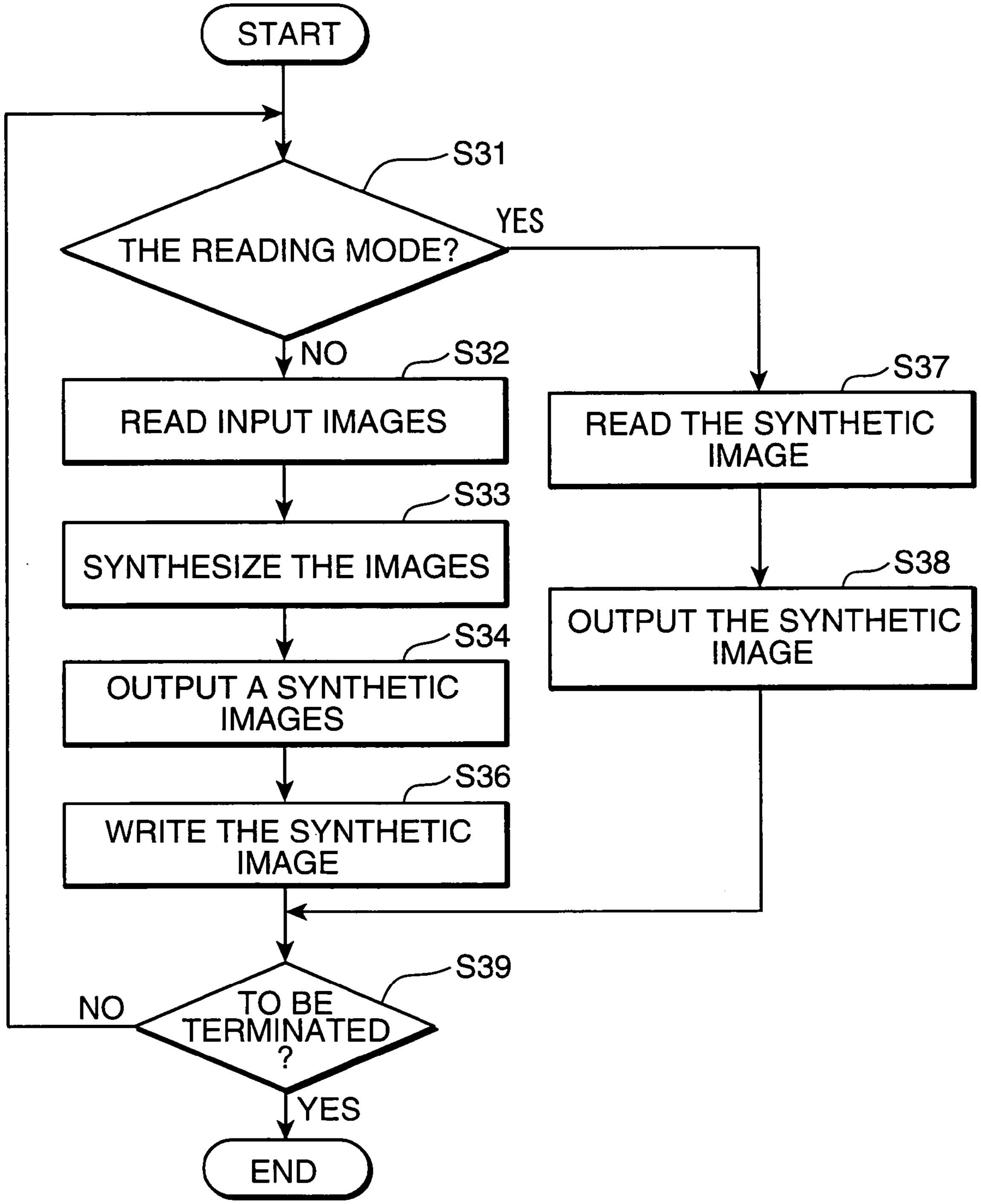
FIG. 17 is a flow chart, showing the operational procedure of a multi-layer image synthesis section in FIG. 15.
Figure 18:
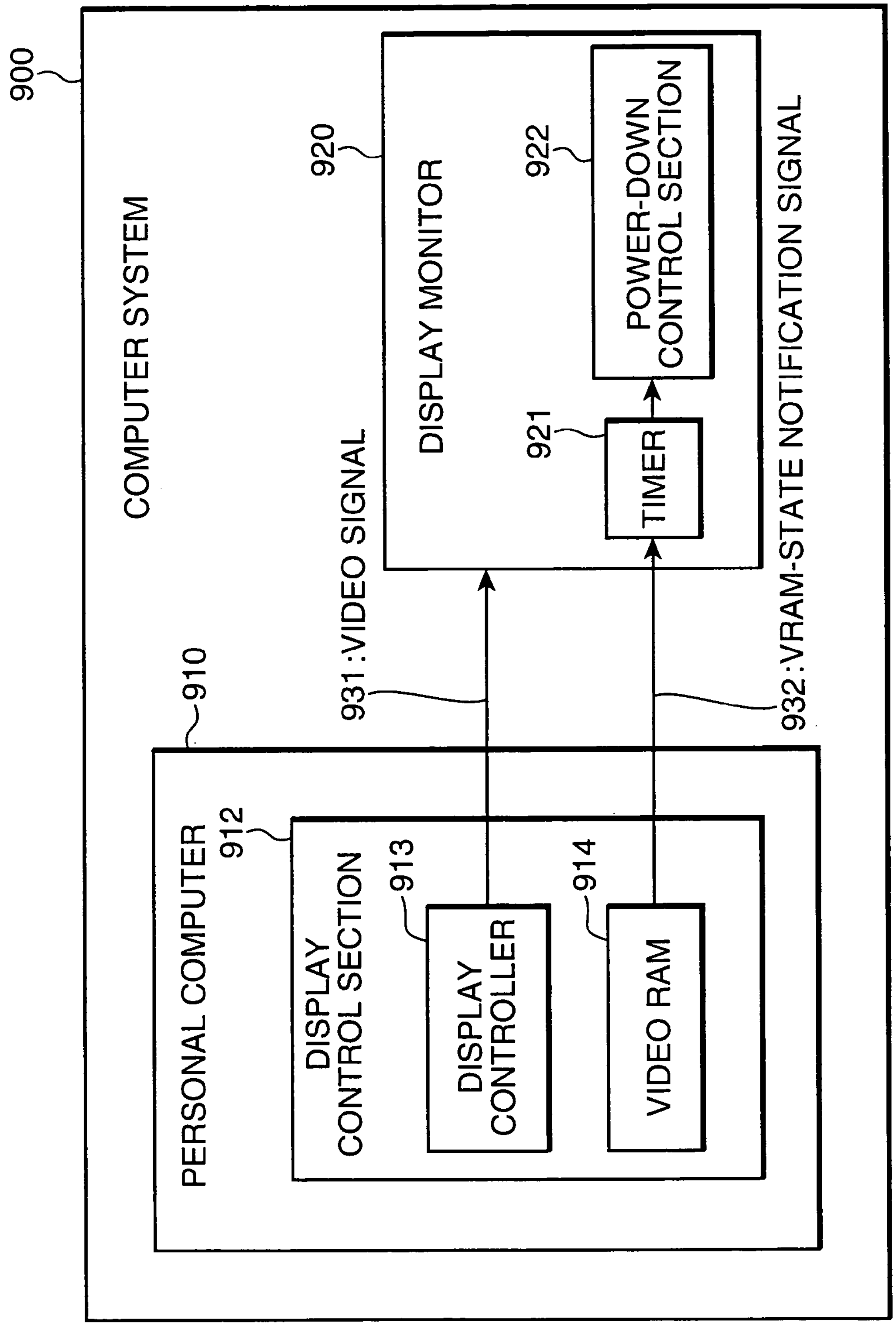
FIG. 18 is a block diagram, showing the configuration of an image synthesis display apparatus according to a prior art.

FIG. 17 is a flow chart, showing the operation procedure of the multi-layer image synthesis section 150 according to this embodiment. In this operational procedure, the decision of the step S35 is removed, which is different from the operational procedure of FIG. 4. Specifically, at the step S31, if the decision is made that the mode instruction information which is stored in the layer-information storage section 142 does not give an instruction for the reading mode (No at the step S31), then the processing of the steps S32 to S34 and S36 is executed.

Hence, in the image synthesis display apparatus according to this embodiment, until the first predetermined period T0 elapses during the period of time when the input image 109 which is stored in the input-image storage section 144 is not updated, the processing of the synthesis writing mode is executed, not the processing of the synthesizing mode. Then, if the input image 109 is not updated and the first predetermined period T0 elapses, since the synthetic image is already stored in the synthetic-image storage section 146, the operation mode shifts to the reading mode. The power consumption in the reading mode is less than the power consumption in the synthesis writing mode. Besides, ordinarily, it is below the power consumption in the synthesizing mode according to the first or second embodiment. Therefore, according to this embodiment, when the image which should be displayed is not updated, the power consumption can be saved in the stage where the images are synthesized.

Other Embodiments (1) In each embodiment described above, the input-image update decision section 122 decides whether or not the input image 109 has been updated (at the step S3 in FIG. 3, FIG. 14 and FIG. 16), in each frame cycle, or in each cycle when the multi-layer image synthesis section 150 outputs one frame of a synthetic image as the output image 159. Thereby, the first predetermined period T0 and the second predetermined period T1 are measured in the unit of a frame cycle. Therefore, as described already, the operation mode can be changed in line with the frame-unit operation of the multi-layer image synthesis section 150. However, generally, this decision's cycle is not limited to a frame cycle or its integer multiples.

(2) In each embodiment described above, the non-update counter control section 124 executes an increment in the count value of the non-update counter 126, by one in each frame cycle (in the step S5 in FIG. 3, FIG. 14 and FIG. 16). In contrast, the non-update counter control section 124 may also execute a decrement in the count value by one. In that case, in the steps S6 and S7, the inequality signs of the decision formulas are reversed. In addition, in the step S1, the non-update counter control section 124 may also reset the count value to another value except "0". For example, the non-update counter control section 124 resets the count value to a positive integer in the step S1. Then, it executes a decrement by one in the step S5. Next, in the step S6, it decides whether or not the count value has become 0.

Furthermore, in the step S5, the non-update counter control section 124 may also execute an increment or a decrement in the count value, for example, using an actual time-width which is measured in the unit of a millisecond, a microsecond or a nanosecond. In that case, in the steps S6 and S7, it compares the count value with a predetermined time which is set in advance. The predetermined time which is set beforehand may also be, for example, a period of time which is equivalent to 50 frames, 100 frames, 100 frames, or the like. Or, it may also be 100 microseconds, 10 milliseconds, 100 milliseconds, or the like.

(3) In each embodiment described above, the non-update counter control section 124 compares information on the fact that it has reset the count value, and the count value, with a predetermined value. Then, it sends, to the operation-mode switch section 128, a decision which it has obtained from that comparison. Based upon such information, the synthesizing-mode instruction section 131 or the like sets the operation mode. In contrast, when it has reset the count value, or when it has compared the count value and has obtained a decision, based on that, the non-update counter control section 124 itself may also decide the operation mode and send the result to the operation-mode switch section 128. In that case, based on the decision, the synthesizing-mode instruction section 131 or the like sets the operation mode.

Moreover, the non-update counter control section 124 sends information on the fact that it has reset the count value to the operation-mode switch section 128. Instead, the layer-information creation section 130 may also be configured so that the input-image update decision section 122 sends the decision that the input image 109 has been updated, not only to the non-update counter control section 124, but also to the operation-mode switch section 128. In that case, based on this information, the synthesizing-mode instruction section 131 of the operation-mode switch section 128 chooses and sets the synthesizing mode.

(4) In each embodiment described above, based on notification signals which are sent from the background-image input control section 103, the camera-image input control section 104 and the party-side compressed-image expansion section 107, the input-image update decision section 122 decides whether or not the input image 109 which is stored in the input-image storage section 144 has been updated (at the step S3 in FIG. 3, FIG. 14 and FIG. 16). In contrast, the input-image update decision section 122 may also decide whether or not the input image 109 has been updated, without using the notification signals. In that case, for example, it makes such a decision by detecting whether or not there is writing access to the input-image storage section 144. Whether or not there is writing access to the input-image storage section 144 is detected in the following way. For example, that is done by detecting, based on an address signal or the like, whether or not there is access to the memory space of the external image memory 140 which is allocated to the input-image storage section 144.

Or, the input-image update decision section 122 may also decide whether or not the input image 109 has been updated in the following way. Specifically, it compares, for each address, the input image 109 which is to be newly stored in the input-image storage section 144 with the input image 109 which has been stored before that. Then, it decides whether or not there are addresses which are different in data from each other. In that case, even if the input image 109 is freshly inputted, the decision is made that the input image 109 has not been updated, as long as there is no change in the image. This helps give a more substantial decision.

The following is a brief summary of the embodiments of the present invention.

(1) An image synthesis output apparatus which receives an input of a plurality of images, synthesizes the plurality of images to generate a synthetic image, and outputs the synthetic image as an output image, comprises: an input-image storage section which stores the plurality of images that are inputted; a synthetic-image storage section which stores the synthetic image; an image synthesis section which shifts an operation mode among a plurality of modes that include a synthesis writing mode in which the plurality of images that are stored in the input-image storage section are read and synthesized to generate the synthetic image, and the synthetic image is outputted as the output image and is written in the synthetic-image storage section, and a reading mode in which the synthetic image that is stored in the synthetic-image storage section is read and is outputted as the output image; and a mode control section which gives the image synthesis section an instruction for any of the plurality of modes.

In addition, the mode control section includes: a synthesis-writing mode instruction section which gives the image synthesis section an instruction for the synthesis writing mode, during the period of time from a latest update time when at least one of the plurality of images which are stored in the input-image storage section is updated latest to the time when a first predetermined period elapses after the latest update time; and a reading mode instruction section which gives the image synthesis section an instruction for the reading mode, during a period of time after the first predetermined period elapses from the latest update time.

With this configuration, during the period of time (which is provisionally called an update period) from the time when the contents which are stored in the input-image storage section are updated latest to the time when the first predetermined period elapses after the latest update time, the mode control section gives the image synthesis section an instruction for the synthesis writing mode. Then, it gives an instruction for the reading mode during a period of time (which is provisionally called a non-update period) after the first predetermined period elapses from the latest update time. Therefore, for example, during a period of time when a new image is continuously inputted within the first predetermined period and the contents which are stored in the input-image storage section are updated within the first predetermined period, the image synthesis section generates a synthetic image out of the plurality of images which are stored in the input-image storage section, and outputs it. Then, it writes the synthetic image which it has generated in the synthetic-image storage section. On the other hand, for example, if a new image is not inputted within the first predetermined period from the latest update time and thus the contents which are stored in the input-image storage section are not updated within the first predetermined period, the image synthesis section does not generate a synthetic image out of the plurality of images which are stored in the input-image storage section. Instead, it reads and outputs the synthetic image which is stored in the synthetic-image storage section. If a new image is inputted after the operation mode of the image synthesis section has shifted to the reading mode, the contents which are stored in the input-image storage section are updated. Thereby, the operation mode returns to the synthesis writing mode.

In this way, during the non-update period when the contents which are stored in the input-image storage section are not updated even after the first predetermined period has elapsed, the image synthesis section executes only the reading from the synthetic-image storage section, without accessing the input-image storage section and executing the image synthesis processing. Therefore, during the non-update period, the total power consumption of the input-image storage section, the synthetic-image storage section and the image synthesis section ordinarily becomes less than that of any prior art. At the same time, the same synthetic image as a synthetic image which is obtained by synthesizing the plurality of images which are stored in the input-image storage section, can be obtained as an output image.

(2) An image synthesis output apparatus which receives an input of a plurality of images, synthesizes the plurality of images to generate a synthetic image, and outputs the synthetic image as an output image, comprises: an input-image storage section which stores the plurality of images that are inputted; a synthetic-image storage section which stores the synthetic image; an image synthesis section which shifts an operation mode among a plurality of modes that include a synthesizing mode in which the plurality of images that are stored in the input-image storage section are read and synthesized to generate the synthetic image, and the synthetic image is outputted as the output image, a synthesis writing mode in which the plurality of images that are stored in the input-image storage section are read and synthesized to generate the synthetic image, and the synthetic image is outputted as the output image and is written in the synthetic-image storage section, and a reading mode in which the synthetic image that is stored in the synthetic-image storage section is read and is outputted as the output image; and a mode control section which gives the image synthesis section an instruction for any of the plurality of modes.

In addition, the mode control section includes: a synthesizing mode instruction section which gives the image synthesis section an instruction for the synthesizing mode, during the period of time from a latest update time when at least one of the plurality of images which are stored in the input-image storage section is updated latest to the time when a first predetermined period elapses after the latest update time; a synthesis-writing mode instruction section which gives the image synthesis section an instruction for the synthesis writing mode, during the period of time from the time when the first predetermined period elapses after the latest update time to the time when a second predetermined period further elapses after the first predetermined period elapses; and a reading mode instruction section which gives the image synthesis section an instruction for the reading mode, during a period of time after the second predetermined period further elapses from the time when the first predetermined period elapses after the latest update time.

With this configuration, during the period of time (which is provisionally called an update period) from the time when the contents which are stored in the input-image storage section are updated latest to the time when the first predetermined period elapses after the latest update time, the mode control section gives the image synthesis section an instruction for the synthesizing mode. Then, during a period of time after the first predetermined period has elapsed from the latest update time, it gives an instruction for the synthesis writing mode. Next, it gives an instruction for the reading mode during a period of time (which is provisionally called a non-update period) after the first predetermined period and the second predetermined period have elapsed from the latest update time. Therefore, for example, during a period of time when anew image is continuously inputted within the first predetermined period and the contents which are stored in the input-image storage section are updated within the first predetermined period, the image synthesis section generates a synthetic image out of the plurality of images which are stored in the input-image storage section, and outputs it. Then, for example, if a new image is not inputted within the first predetermined period from the latest update time and thus the contents which are stored in the input-image storage section are not updated within the first predetermined period, the image synthesis section generates a synthetic image and outputs it. Then, it writes the synthetic image which it has generated in the synthetic-image storage section. In addition, for example, if a new image is not inputted from the latest update time to the time when the first predetermined period and the second predetermined period elapse, the image synthesis section does not generate a synthetic image out of the plurality of images which are stored in the input-image storage section. Instead, it reads and outputs the synthetic image which is stored in the synthetic-image storage section. If a new image is inputted after the operation mode of the image synthesis section has shifted to the synthesis writing mode or the reading mode, the contents which are stored in the input-image storage section are updated. Thereby, the operation mode returns to the synthesizing mode.

In this way, during the non-update period when the contents which are stored in the input-image storage section are not updated even after the first predetermined period and the second predetermined period have elapsed, the image synthesis section executes only the reading from the synthetic-image storage section, without accessing the input-image storage section and executing the image synthesis processing. Therefore, during the non-update period, the total power consumption of the input-image storage section, the synthetic-image storage section and the image synthesis section ordinarily becomes less than that of any prior art. At the same time, the same synthetic image as a synthetic image which is obtained by synthesizing the plurality of images which are stored in the input-image storage section, can be obtained as an output image. In addition, the image synthesis section executes the writing of the synthetic image in the synthetic-image storage section in preparation for the non-update period, only during a period of time which is immediately before the non-update period. During the update period before that, it executes only the processing of the synthetic image without executing the writing of the synthetic image. This also saves a power consumption during the update period.

(3) An image synthesis output apparatus which receives an input of a plurality of images, synthesizes the plurality of images to generate a synthetic image, and outputs the synthetic image as an output image, comprises: an input-image storage section which stores the plurality of images that are inputted; a synthetic-image storage section which stores the synthetic image; an image synthesis section which shifts an operation mode among a plurality of modes that include a synthesizing mode in which the plurality of images that are stored in the input-image storage section are read and synthesized to generate the synthetic image, and the synthetic image is outputted as the output image, a synthesis writing mode in which the plurality of images that are stored in the input-image storage section are read and synthesized to generate the synthetic image, and the synthetic image is outputted as the output image and is written in the synthetic-image storage section, and a reading mode in which the synthetic image that is stored in the synthetic-image storage section is read and is outputted as the output image; and a mode control section which gives the image synthesis section an instruction for any of the plurality of modes.

In addition, the mode control section includes: a synthesizing mode instruction section which gives the image synthesis section an instruction for the synthesizing mode, during the period of time from a latest update time when at least one of the plurality of images which are stored in the input-image storage section is updated latest to the time when a first predetermined period elapses after the latest update time; a power-consumption decision section which, if the first predetermined period elapses after the latest update time, evaluates a first power consumption which is necessary for the image synthesis section to read the plurality of images from the input-image storage section and synthesize the plurality of images and a second power consumption which is necessary for the image synthesis section to read the synthetic image from the synthetic-image storage section, and decides whether or not the first power consumption is more than the second power consumption; a synthesis-writing mode instruction section which, if the power-consumption decision section obtains the positive decision when the first predetermined period elapses after the latest update time, gives the image synthesis section an instruction for the synthesis writing mode, during the period of time from the time when the first predetermined period elapses after the latest update time to the time when a second predetermined period further elapses after the first predetermined period elapses; and a reading mode instruction section which, if the power-consumption decision section obtains the positive decision when the first predetermined period elapses after the latest update time, gives the image synthesis section an instruction for the reading mode, during a period of time after the second predetermined period further elapses from the time when the first predetermined period elapses after the latest update time.

With this configuration, during the period of time (which is provisionally called an update period) from the time when the contents which are stored in the input-image storage section are updated latest to the time when the first predetermined period elapses after the latest update time, the mode control section gives the image synthesis section an instruction for the synthesizing mode. Then, after the first predetermined period has elapsed from the latest update time, it evaluates the first and second power consumptions. If the decision is made that the first power consumption is more than the second power consumption, afterward, during the period to the time when the first predetermined period and the second predetermined period elapse from the latest update time, the mode control section gives the image synthesis section an instruction for the synthesis writing mode. Next, it gives an instruction for the reading mode during a period of time (which is provisionally called a non-update period) after the first predetermined period and the second predetermined period have elapsed from the latest update time.

Therefore, for example, during a period of time when a new image is continuously inputted within the first predetermined period and the contents which are stored in the input-image storage section are updated within the first predetermined period, the image synthesis section generates a synthetic image out of the plurality of images which are stored in the input-image storage section, and outputs it. Then, for example, if a new image is not inputted within the first predetermined period from the latest update time and thus the contents which are stored in the input-image storage section are not updated within the first predetermined period, on the condition that the decision is made that the first power consumption is more than the second power consumption, during the period of time from the latest update time to the time when the first predetermined period and the second predetermined period elapse, the image synthesis section generates a synthetic image and outputs it. Then, it writes the synthetic image which it has generated in the synthetic-image storage section. Thereafter, if a new image is not inputted even after the second predetermined period has elapsed, the image synthesis section does not generate a synthetic image out of the plurality of images which are stored in the input-image storage section. Instead, it reads and outputs the synthetic image which is stored in the synthetic-image storage section. If a new image is inputted after the operation mode of the image synthesis section has shifted to the synthesis writing mode or the reading mode, the contents which are stored in the input-image storage section are updated. Thereby, the operation mode returns to the synthesizing mode.

In this way, if the decision is made that the first power consumption is more than the second power consumption when the first predetermined period has elapsed after the latest update time, during the non-update period when the contents which are stored in the input-image storage section are not updated even after the first predetermined period and the second predetermined period have elapsed, the image synthesis section executes only the reading from the synthetic-image storage section, without accessing the input-image storage section and executing the image synthesis processing. Therefore, during the non-update period, the total power consumption of the input-image storage section, the synthetic-image storage section and the image synthesis section, can be saved. At the same time, the same synthetic image as a synthetic image which is obtained by synthesizing the plurality of images which are stored in the input-image storage section, can be obtained as an output image. In addition, the image synthesis section executes the writing of the synthetic image in the synthetic-image storage section in preparation for the non-update period, only during a period of time which is immediately before the non-update period. During the update period before that, it executes only the image synthesis processing without executing the writing of the synthetic image. This also saves a power consumption during the update period. Besides, a shift is made from the synthesizing mode to the synthesis writing mode and the reading mode, on the condition that the first power consumption is more than the second power consumption, in other words, that in the reading mode, the total power consumption of the input-image storage section, the synthetic-image storage section and the image synthesis section is less than that in the synthesizing mode. This prevents the operation mode from being shifted even in the case where a saving effect on a power consumption cannot be obtained, depending upon the data quantity or the like of an inputted image.

(4) The image synthesis output apparatus is the apparatus (3), wherein the power-consumption decision section evaluates the first power consumption as the quantity which is proportional to the data quantity of the plurality of images which are stored in the input-image storage section, and evaluates the second power consumption as the quantity which is proportional to the data quantity of the synthetic image which is to be written in the synthetic-image storage section.

With this configuration, the power-consumption decision section evaluates the first power consumption as the quantity which is proportional to the data quantity of the plurality of images which are stored in the input-image storage section, and evaluates the second power consumption as the quantity which is proportional to the data quantity of the synthetic image which is to be written in the synthetic-image storage section. Therefore, the first and second power consumptions can be evaluated within a short period of time, using a simple calculation. In the synthesizing mode, the image synthesis section handles the plurality of images which are stored in the input-image storage section. Hence, the first power consumption can be approximately evaluated as the quantity which is proportional to the data quantity of the plurality of images. Similarly, in the reading mode, the image synthesis section handles the synthetic image which is stored in the synthetic-image storage section. Hence, the second power consumption can be approximately evaluated as the quantity which is proportional to the data quantity of the synthetic image. Herein, both operation modes are different in the processing from each other. Thus, the proportional coefficient of the first power consumption to the data quantity of the plurality of images is generally different from the proportional coefficient of the second power consumption to the data quantity of the synthetic image. According to this configuration, using an approximate correlation between such a power consumption and the quantity of data, the first and second power consumptions can be evaluated relatively precisely and within a short period of time.

(5) The image synthesis output apparatus is any one of the apparatuses (1) to (4), wherein the mode control section measures the first predetermined period in the unit of a cycle in which the image synthesis section outputs one frame of the synthetic image.

With this configuration, the mode control section measures the first predetermined period in the unit of a cycle in which the image synthesis section outputs one frame of the synthetic image. Therefore, the operation mode can be changed in step with the frame-unit operation of the image synthesis section.

(6) The image synthesis output apparatus is any one of the apparatuses (2) to (4), wherein the mode control section measures the second predetermined period in the unit of a cycle in which the image synthesis section outputs one frame of the synthetic image.

With this configuration, the mode control section measures the second predetermined period in the unit of a cycle in which the image synthesis section outputs one frame of the synthetic image. Therefore, the operation mode can be changed in step with the frame-unit operation of the image synthesis section.

(7) The image synthesis output apparatus is the apparatus (6), wherein the second predetermined period is the same length as the cycle.

With this configuration, the second predetermined period is set to the same length as the cycle in which one frame of the synthetic image is outputted. Therefore, the period of time when the processing of the synthesis writing mode in which more power is consumed is executed, can be kept at a required minimum length.

(8) The image synthesis output apparatus is any one of the apparatuses (1) to (7), wherein the mode control section further includes an input-image update decision section which detects that at least one of the plurality of images that are stored in the input-image storage section is updated, based on an update notification signal which is inputted according to each input of the plurality of images.

With this configuration, the input-image update decision section detects that the image has been updated on the basis of the update notification signal. Therefore, a decision can be made simply and within a short period of time on whether or not the image has been updated.

(9) The image synthesis output apparatus is any one of the apparatuses (1) to (8), wherein the input-image storage section and the synthetic-image storage section are each a memory space which is allocated to a single memory.

With this configuration, the input-image storage section and the synthetic-image storage section are each a memory space which is allocated to a single memory. This makes it possible to realize these storage sections at a low cost. Its advantage becomes clear if you make its comparison with, for example, a configuration where in an image synthesis display apparatus which includes a display unit as well as the image synthesis output apparatus, the synthetic-image storage section is incorporated on the side of the display unit. In the image synthesis output apparatus according to the configuration of this aspect where the input-image storage section and the synthetic-image storage section are allocated together within a single memory, production costs become lower.

(10) An image synthesis display apparatus comprises: any one of the image synthesis output apparatuses (1) to (9); and a display unit which displays the output image which is outputted by the image synthesis section.

With this configuration, there are provided with the image synthesis output apparatus according to the present invention and the display unit. This presents an effect of each configuration described above.

(11) A portable communication equipment comprises the image synthesis display apparatus (10).

With this configuration, there is provided with the image synthesis display apparatus according to the present invention. This presents an effect of each configuration described above. In the portable communication equipment, a battery is usually used as its power source. Hence, this configuration lengthens the life of a battery, thus making it more portable and useful.

(12) An image synthesis output method in which an input of a plurality of images is received, the plurality of images are synthesized to generate a synthetic image, and the synthetic image is outputted as an output image, comprises: a step of preparing an input-image storage unit which stores the plurality of images that are inputted; a step of preparing a synthetic-image storage unit which stores the synthetic image; a step of preparing an image synthesis unit which shifts an operation mode among a plurality of modes that include a synthesis writing mode in which the plurality of images that are stored in the input-image storage unit are read and synthesized to generate the synthetic image, and the synthetic image is outputted as the output image and is written in the synthetic-image storage unit, and a reading mode in which the synthetic image that is stored in the synthetic-image storage unit is read and is outputted as the output image; and a mode control step of giving the image synthesis unit an instruction for any of the plurality of modes.

In addition, the mode control step includes: a synthesis-writing mode instruction step of giving the image synthesis unit an instruction for the synthesis writing mode, during the period of time from a latest update time when at least one of the plurality of images which are stored in the input-image storage unit is updated latest to the time when a first predetermined period elapses after the latest update time; and a reading mode instruction step of giving the image synthesis unit an instruction for the reading mode, during a period of time after the first predetermined period elapses from the latest update time.

With this configuration, in the mode control step, during the period of time (which is provisionally called an update period) from the time when the contents which are stored in the input-image storage unit are updated latest to the time when the first predetermined period elapses after the latest update time, an instruction for the synthesis writing mode is given to the image synthesis unit. Then, an instruction for the reading mode is given during a period of time (which is provisionally called a non-update period) after the first predetermined period elapses from the latest update time. Therefore, for the same reason as the one which is described about the configuration according to the first aspect, during the non-update period, the total power consumption of the input-image storage unit, the synthetic-image storage unit and the image synthesis unit ordinarily becomes less than that of any prior art. At the same time, the same synthetic image as a synthetic image which is obtained by synthesizing the plurality of images which are stored in the input-image storage unit, can be obtained as an output image.

(13) An image synthesis output method in which an input of a plurality of images is received, the plurality of images are synthesized to generate a synthetic image, and the synthetic image is outputted as an output image, comprises: a step of preparing an input-image storage unit which stores the plurality of images that are inputted; a step of preparing a synthetic-image storage unit which stores the synthetic image; a step of preparing an image synthesis unit which shifts an operation mode among a plurality of modes that include a synthesizing mode in which the plurality of images that are stored in the input-image storage unit are read and synthesized to generate the synthetic image, and the synthetic image is outputted as the output image, a synthesis writing mode in which the plurality of images that are stored in the input-image storage unit are read and synthesized to generate the synthetic image, and the synthetic image is outputted as the output image and is written in the synthetic-image storage unit, and a reading mode in which the synthetic image that is stored in the synthetic-image storage unit is read and is outputted as the output image; and a mode control step of giving the image synthesis unit an instruction for any of the plurality of modes.

In addition, the mode control step includes: a synthesizing mode instruction step of giving the image synthesis unit an instruction for the synthesizing mode, during the period of time from a latest update time when at least one of the plurality of images which are stored in the input-image storage unit is updated latest to the time when a first predetermined period elapses after the latest update time; a synthesis-writing mode instruction step of giving the image synthesis unit an instruction for the synthesis writing mode, during the period of time from the time when the first predetermined period elapses after the latest update time to the time when a second predetermined period further elapses after the first predetermined period elapses; and a reading mode instruction step of giving the image synthesis unit an instruction for the reading mode, during a period of time after the second predetermined period further elapses from the time when the first predetermined period elapses after the latest update time.

With this configuration, in the mode control step, during the period of time (which is provisionally called an update period) from the time when the contents which are stored in the input-image storage unit are updated latest to the time when the first predetermined period elapses after the latest update time, an instruction for the synthesizing mode is given to the image synthesis unit. Then, during a period of time after the first predetermined period has elapsed from the latest update time, an instruction for the synthesis writing mode is given. Next, an instruction for the reading mode is given during a period of time (which is provisionally called a non-update period) after the first predetermined period and the second predetermined period have elapsed from the latest update time. Therefore, for the same reason as the one which is described about the configuration according to the second aspect, during the non-update period, the total power consumption of the input-image storage unit, the synthetic-image storage unit and the image synthesis unit ordinarily becomes less than that of any prior art. At the same time, the same synthetic image as a synthetic image which is obtained by synthesizing the plurality of images which are stored in the input-image storage unit, can be obtained as an output image. This configuration also saves a power consumption during the update period.

(14) An image synthesis output method in which an input of a plurality of images is received, the plurality of images are synthesized to generate a synthetic image, and the synthetic image is outputted as an output image, comprises: a step of preparing an input-image storage unit which stores the plurality of images that are inputted; a step of preparing a synthetic-image storage unit which stores the synthetic image; a step of preparing an image synthesis unit which shifts an operation mode among a plurality of modes that include a synthesizing mode in which the plurality of images that are stored in the input-image storage unit are read and synthesized to generate the synthetic image, and the synthetic image is outputted as the output image, a synthesis writing mode in which the plurality of images that are stored in the input-image storage unit are read and synthesized to generate the synthetic image, and the synthetic image is outputted as the output image and is written in the synthetic-image storage unit, and a reading mode in which the synthetic image that is stored in the synthetic-image storage unit is read and is outputted as the output image; and a mode control step of giving the image synthesis unit an instruction for any of the plurality of modes.

In addition, the mode control step includes: a synthesizing mode instruction step of giving the image synthesis unit an instruction for the synthesizing mode, during the period of time from a latest update time when at least one of the plurality of images which are stored in the input-image storage unit is updated latest to the time when a first predetermined period elapses after the latest update time; a power-consumption decision step of, if the first predetermined period elapses after the latest update time, evaluating a first power consumption which is necessary for the image synthesis unit to read the plurality of images from the input-image storage unit and synthesize the plurality of images and a second power consumption which is necessary for the image synthesis unit to read the synthetic image from the synthetic-image storage unit, and deciding whether or not the first power consumption is more than the second power consumption; a synthesis-writing mode instruction step of, if the positive decision is obtained in the power-consumption decision step when the first predetermined period elapses after the latest update time, giving the image synthesis unit an instruction for the synthesis writing mode, during the period of time from the time when the first predetermined period elapses after the latest update time to the time when a second predetermined period further elapses after the first predetermined period elapses; and a reading mode instruction step of, if the positive decision is obtained in the power-consumption decision step when the first predetermined period elapses after the latest update time, giving the image synthesis unit an instruction for the reading mode, during a period of time after the second predetermined period further elapses from the time when the first predetermined period elapses after the latest update time.

With this configuration, in the mode control step, during the period of time (which is provisionally called an update period) from the time when the contents which are stored in the input-image storage unit are updated latest to the time when the first predetermined period elapses after the latest update time, an instruction for the synthesizing mode is given to the image synthesis unit. Then, after the first predetermined period has elapsed from the latest update time, the first and second power consumptions are evaluated. In the mode control step, if the decision is made that the first power consumption is more than the second power consumption, afterward, during the period to the time when the first predetermined period and the second predetermined period elapse from the latest update time, an instruction for the synthesis writing mode is given to the image synthesis section. Next, an instruction for the reading mode is given during a period of time (which is provisionally called a non-update period) after the first predetermined period and the second predetermined period have elapsed from the latest update time. Therefore, for the same reason as the one which is described about the configuration according to the third aspect, during the non-update period, the total power consumption of the input-image storage unit, the synthetic-image storage unit and the image synthesis unit can be saved. At the same time, the same synthetic image as a synthetic image which is obtained by synthesizing the plurality of images which are stored in the input-image storage unit, can be obtained as an output image. This configuration also saves a power consumption during the update period. In addition, the operation mode can be prevented from being shifted even in the case where a saving effect on a power consumption cannot be obtained, depending upon the data quantity or the like of an inputted image.

(15) A program product, comprises: an image synthesis output program which allows a computer to operate, the computer being incorporated in an image synthesis output apparatus which receives an input of a plurality of images, synthesizes the plurality of images to generate a synthetic image, and outputs the synthetic image as an output image; and a signal holding medium for holding the image synthesis output program.

The image synthesis output apparatus includes, an input-image storage section which stores the plurality of images that are inputted, a synthetic-image storage section which stores the synthetic image, an image synthesis section which shifts an operation mode among a plurality of modes that include a synthesis writing mode in which the plurality of images that are stored in the input-image storage section are read and synthesized to generate the synthetic image, and the synthetic image is outputted as the output image and is written in the synthetic-image storage section, and a reading mode in which the synthetic image that is stored in the synthetic-image storage section is read and is outputted as the output image, and the computer.

In addition, the image synthesis output program is a program for allowing the computer to function as, a synthesis-writing mode instruction section which gives the image synthesis section an instruction for the synthesis writing mode, during the period of time from a latest update time when at least one of the plurality of images which are stored in the input-image storage section is updated latest to the time when a first predetermined period elapses after the latest update time, and a reading mode instruction section which gives the image synthesis section an instruction for the reading mode, during a period of time after the first predetermined period elapses from the latest update time.

With this configuration, during the period of time (which is provisionally called an update period) from the time when the contents which are stored in the input-image storage section are updated latest to the time when the first predetermined period elapses after the latest update time, the computer which executes the program gives the image synthesis section an instruction for the synthesis writing mode. Then, it gives an instruction for the reading mode during a period of time (which is provisionally called a non-update period) after the first predetermined period elapses from the latest update time. Therefore, for the same reason as the one which is described about the configuration according to the first aspect, during the non-update period, the total power consumption of the input-image storage section, the synthetic-image storage section and the image synthesis section ordinarily becomes less than that of any prior art. At the same time, the same synthetic image as a synthetic image which is obtained by synthesizing the plurality of images which are stored in the input-image storage section, can be obtained as an output image.

(16) A program product, comprises: an image synthesis output program which allows a computer to operate, the computer being incorporated in an image synthesis output apparatus which receives an input of a plurality of images, synthesizes the plurality of images to generate a synthetic image, and outputs the synthetic image as an output image; and a signal holding medium for holding the image synthesis output program.

The image synthesis output apparatus includes, an input-image storage section which stores the plurality of images that are inputted, a synthetic-image storage section which stores the synthetic image, an image synthesis section which shifts an operation mode among a plurality of modes that include a synthesizing mode in which the plurality of images that are stored in the input-image storage section are read and synthesized to generate the synthetic image, and the synthetic image is outputted as the output image, a synthesis writing mode in which the plurality of images that are stored in the input-image storage section are read and synthesized to generate the synthetic image, and the synthetic image is outputted as the output image and is written in the synthetic-image storage section, and a reading mode in which the synthetic image that is stored in the synthetic-image storage section is read and is outputted as the output image, and the computer.

In addition, the image synthesis output program is a program for allowing the computer to function as, a synthesizing mode instruction section which gives the image synthesis section an instruction for the synthesizing mode, during the period of time from a latest update time when at least one of the plurality of images which are stored in the input-image storage section is updated latest to the time when a first predetermined period elapses after the latest update time, a synthesis-writing mode instruction section which gives the image synthesis section an instruction for the synthesis writing mode, during the period of time from the time when the first predetermined period elapses after the latest update time to the time when a second predetermined period further elapses after the first predetermined period elapses, and a reading mode instruction section which gives the image synthesis section an instruction for the reading mode, during a period of time after the second predetermined period further elapses from the time when the first predetermined period elapses after the latest update time.

With this configuration, during the period of time (which is provisionally called an update period) from the time when the contents which are stored in the input-image storage section are updated latest to the time when the first predetermined period elapses after the latest update time, the computer which executes the program gives the image synthesis section an instruction for the synthesizing mode. Then, during a period of time after the first predetermined period has elapsed from the latest update time, it gives an instruction for the synthesis writing mode. Next, it gives an instruction for the reading mode during a period of time (which is provisionally called a non-update period) after the first predetermined period and the second predetermined period have elapsed from the latest update time. Therefore, for the same reason as the one which is described about the configuration according to the second aspect, during the non-update period, the total power consumption of the input-image storage section, the synthetic-image storage section and the image synthesis section ordinarily becomes less than that of any prior art. At the same time, the same synthetic image as a synthetic image which is obtained by synthesizing the plurality of images which are stored in the input-image storage section, can be obtained as an output image. In addition, a power consumption can also be saved during the update period.

(17) A program product, comprises: an image synthesis output program which allows a computer to operate, the computer being incorporated in an image synthesis output apparatus which receives an input of a plurality of images, synthesizes the plurality of images to generate a synthetic image, and outputs the synthetic image as an output image; and a signal holding medium for holding the image synthesis output program.

The image synthesis output apparatus includes, an input-image storage section which stores the plurality of images that are inputted, a synthetic-image storage section which stores the synthetic image, an image synthesis section which shifts an operation mode among a plurality of modes that include a synthesizing mode in which the plurality of images that are stored in the input-image storage section are read and synthesized to generate the synthetic image, and the synthetic image is outputted as the output image, a synthesis writing mode in which the plurality of images that are stored in the input-image storage section are read and synthesized to generate the synthetic image, and the synthetic image is outputted as the output image and is written in the synthetic-image storage section, and a reading mode in which the synthetic image that is stored in the synthetic-image storage section is read and is outputted as the output image, and the computer.

In addition, the image synthesis output program is a program for allowing the computer to function as, a synthesizing mode instruction section which gives the image synthesis section an instruction for the synthesizing mode, during the period of time from a latest update time when at least one of the plurality of images which are stored in the input-image storage section is updated latest to the time when a first predetermined period elapses after the latest update time, a power-consumption decision section which, if the first predetermined period elapses after the latest update time, evaluates a first power consumption which is necessary for the image synthesis section to read the plurality of images from the input-image storage section and synthesize the plurality of images and a second power consumption which is necessary for the image synthesis section to read the synthetic image from the synthetic-image storage section, and decides whether or not the first power consumption is more than the second power consumption, a synthesis-writing mode instruction section which, if the power-consumption decision section obtains the positive decision when the first predetermined period elapses after the latest update time, gives the image synthesis section an instruction for the synthesis writing mode, during the period of time from the time when the first predetermined period elapses after the latest update time to the time when a second predetermined period further elapses after the first predetermined period elapses, and a reading mode instruction section which, if the power-consumption decision section obtains the positive decision when the first predetermined period elapses after the latest update time, gives the image synthesis section an instruction for the reading mode, during a period of time after the second predetermined period further elapses from the time when the first predetermined period elapses after the latest update time.

With this configuration, during the period of time (which is provisionally called an update period) from the time when the contents which are stored in the input-image storage section are updated latest to the time when the first predetermined period elapses after the latest update time, the computer which executes the program gives the image synthesis section an instruction for the synthesizing mode. Then, after the first predetermined period has elapsed from the latest update time, it evaluates the first and second power consumptions. If the decision is made that the first power consumption is more than the second power consumption, afterward, during the period to the time when the first predetermined period and the second predetermined period elapse from the latest update time, the computer gives the image synthesis section an instruction for the synthesis writing mode. Next, it gives an instruction for the reading mode during a period of time (which is provisionally called a non-update period) after the first predetermined period and the second predetermined period have elapsed from the latest update time. Therefore, for the same reason as the one which is described about the configuration according to the third aspect, during the non-update period, the total power consumption of the input-image storage section, the synthetic-image storage section and the image synthesis section ordinarily, can be saved. At the same time, the same synthetic image as a synthetic image which is obtained by synthesizing the plurality of images which are stored in the input-image storage section, can be obtained as an output image. In addition, a power consumption can also be saved during the update period. Besides, the operation mode can be prevented from being shifted even in the case where a saving effect on a power consumption cannot be obtained, depending upon the data quantity or the like of an inputted image.

(18) A program product is any one of the program products (15) to (17), wherein the signal holding medium is at least one of a storage medium and a transmission medium.

With this configuration, the image synthesis output program is read by a computer from at least one of the storage medium and the transmission medium, and thereby, the image synthesis output program is executed. As a result, the operation and effects of any one of the image synthesis output apparatuses (1) to (3) are realized.

The present invention is industrially useful because it is capable of saving a power consumption that is necessary for obtaining a synthetic image of a plurality of images which is stored in a means for storing an image, during the period when the stored images are not updated.

This application is based on Japanese patent application serial No. 2004-146284, filed in Japan Patent Office on May 17, 2004 and No. 2005-122361, filed in Japan Patent Office on Apr. 20, 2005, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image synthesis output apparatus which receives an input of a plurality of images, synthesizes the plurality of images to generate a synthetic image, and outputs the synthetic image as an output image, the image synthesis output apparatus comprising:

an input-image storage section which stores the plurality of images;

a synthetic-image storage section which stores the synthetic image;

an image synthesis section which shifts an operation mode among a plurality of modes that include a synthesizing mode in which the plurality of images that are stored in the input-image storage section are read and synthesized to generate the synthetic image, and the synthetic image is outputted as the output image, a synthesis writing mode in which the plurality of images that are stored in the input-image storage section are read and synthesized to generate the synthetic image, and the synthetic image is outputted as the output image and is stored in the synthetic-image storage section, and a reading mode in which the synthetic image that is stored in the synthetic-image storage section is read and is outputted as the output image; and a mode control section which gives the image synthesis section an instruction for any of the plurality of modes, wherein the mode control section includes:

a synthesizing mode instruction section which gives the image synthesis section an instruction for the synthesizing mode, during a period of time from a latest update time when at least one of the plurality of images which are stored in the input-image storage section is most recently updated to a time when a first predetermined period elapses after the latest update time;

a power-consumption decision section which, if the first predetermined period elapses after the latest update time, evaluates a first power consumption which is necessary for the image synthesis section to read the plurality of images from the input-image storage section and synthesize the plurality of images and a second power consumption which is necessary for the image synthesis section to read the synthetic image from the synthetic-image storage section, and decides whether or not the first power consumption is more than the second power consumption;

a synthesis-writing mode instruction section which, if the power-consumption decision section obtains a positive decision when the first predetermined period elapses after the latest update time, gives the image synthesis section an instruction for the synthesis writing mode, during the period of time from when the first predetermined period elapses after the latest update time to when a second predetermined period further elapses after the first predetermined period elapses; and a reading mode instruction section which, if the power-consumption decision section obtains the positive decision when the first predetermined period elapses after the latest update time, gives the image synthesis section an instruction for the reading mode, during a period of time after the second predetermined period further elapses from when the first predetermined period elapses after the latest update time.

2. The image synthesis output apparatus according to claim 1, wherein the power-consumption decision section evaluates the first power consumption as a quantity which is proportional to a data quantity of the plurality of images which are stored in the input-image storage section, and evaluates the second power consumption as a quantity which is proportional to a data quantity of the synthetic image which is to be stored in the synthetic-image storage section.

3. The image synthesis output apparatus according to claim 1, wherein the mode control section measures the first predetermined period in the unit of a cycle in which the image synthesis section outputs one frame of the synthetic image.

4. The image synthesis output apparatus according to claim 1, wherein the mode control section measures the second predetermined period in the unit of a cycle in which the image synthesis section outputs one frame of the synthetic image.

5. The image synthesis output apparatus according to claim 4, wherein the second predetermined period is the same length as the cycle.

6. The image synthesis output apparatus according to claim 1, wherein the mode control section further includes an input-image update decision section which detects that at least one of the plurality of images that are stored in the input-image storage section is updated, based on an update notification signal which is inputted according to each input of the plurality of images.

7. The image synthesis output apparatus according to claim 1, wherein the input-image storage section and the synthetic-image storage section are each a memory space which is allocated to a single memory.

8. An image synthesis display apparatus, comprising:

the image synthesis output apparatus according to claim 1; and a display unit which displays the output image which is outputted by the image synthesis section.

9. A portable communication equipment, comprising the image synthesis display apparatus according to claim 8.

10. An image synthesis output method in which an input of a plurality of images is received, the plurality of images are synthesized to generate a synthetic image, and the synthetic image is outputted as an output image, the method comprising:

preparing an input-image storage unit which stores the plurality of images;

preparing a synthetic-image storage unit which stores the synthetic image;

preparing an image synthesis unit which shifts an operation mode among a plurality of modes that include a synthesizing mode in which the plurality of images that are stored in the input-image storage unit are read and synthesized to generate the synthetic image, and the synthetic image is outputted as the output image, a synthesis writing mode in which the plurality of images that are stored in the input-image storage unit are read and synthesized to generate the synthetic image, and the synthetic image is outputted as the output image and is stored in the synthetic-image storage unit, and a reading mode in which the synthetic image that is stored in the synthetic-image storage unit is read and is outputted as the output image; and giving the image synthesis unit an instruction for any of the plurality of modes, wherein the giving operation includes:

giving, performed by a processor, the image synthesis unit an instruction for the synthesizing mode, during a period of time from a latest update time when at least one of the plurality of images which are stored in the input-image storage unit is most recently updated to a time when a first predetermined period elapses after the latest update time;

evaluating, if the first predetermined period elapses after the latest update time, a first power consumption which is necessary for the image synthesis unit to read the plurality of images from the input-image storage unit and synthesize the plurality of images and a second power consumption which is necessary for the image synthesis unit to read the synthetic image from the synthetic-image storage unit, and deciding whether or not the first power consumption is more than the second power consumption;

giving, performed by the processor, the image synthesis unit an instruction for the synthesis writing mode, during the period of time from when the first predetermined period elapses after the latest update time to when a second predetermined period further elapses after the first predetermined period elapses, if a positive decision is obtained in the evaluating operation when the first predetermined period elapses after the latest update time; and giving, performed by the processor, the image synthesis unit an instruction for the reading mode, during a period of time after the second predetermined period further elapses from when the first predetermined period elapses after the latest update time, if the positive decision is obtained in the evaluating operation when the first predetermined period elapses after the latest update time.

11. An image synthesis output program recorded on a computer readable recording medium for causing a computer, that is incorporated in an image synthesis output apparatus which receives an input of a plurality of images, to at least operate, synthesize the plurality of images to generate a synthetic image, and output the synthetic image as an output image, wherein the image synthesis output apparatus includes:

an input-image storage section which stores the plurality of images that are inputted;

a synthetic-image storage section which stores the synthetic image;

an image synthesis section which shifts an operation mode among a plurality of modes that include a synthesizing mode in which the plurality of images that are stored in the input-image storage section are read and synthesized to generate the synthetic image, and the synthetic image is outputted as the output image, a synthesis writing mode in which the plurality of images that are stored in the input-image storage section are read and synthesized to generate the synthetic image, and the synthetic image is outputted as the output image and is stored in the synthetic-image storage section, and a reading mode in which the synthetic image that is stored in the synthetic-image storage section is read and is outputted as the output image; and the computer, wherein the image synthesis output program is a program for allowing the computer to function as:

a synthesizing mode instruction section which gives the image synthesis section an instruction for the synthesizing mode, during a period of time from a latest update time when at least one of the plurality of images which are stored in the input-image storage section is most recently updated to a time when a first predetermined period elapses after the latest update time;

a power-consumption decision section which, if the first predetermined period elapses after the latest update time, evaluates a first power consumption which is necessary for the image synthesis section to read the plurality of images from the input-image storage section and synthesize the plurality of images and a second power consumption which is necessary for the image synthesis section to read the synthetic image from the synthetic-image storage section, and decides whether or not the first power consumption is more than the second power consumption;

a synthesis-writing mode instruction section which, if the power-consumption decision section obtains a positive decision when the first predetermined period elapses after the latest update time, gives the image synthesis section an instruction for the synthesis writing mode, during the period of time from when the first predetermined period elapses after the latest update time to when a second predetermined period further elapses after the first predetermined period elapses; and a reading mode instruction section which, if the power-consumption decision section obtains the positive decision when the first predetermined period elapses after the latest update time, gives the image synthesis section an instruction for the reading mode, during a period of time after the second predetermined period further elapses from when the first predetermined period elapses after the latest update time.

* * * * *